(12) United States Patent
Kim et al.

(10) Patent No.: US 10,831,392 B2
(45) Date of Patent: Nov. 10, 2020

(54) VOLATILE AND NONVOLATILE MEMORY MANAGEMENT METHOD AND ELECTRONIC DEVICE

(71) Applicant: Samsung Electronics Co., Ltd., Suwon-si (KR)

(72) Inventors: Chulmin Kim, Suwon-si (KR); Sunae Seo, Suwon-si (KR); Sooyong Suk, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/075,447

(22) PCT Filed: Jan. 11, 2017

(86) PCT No.: PCT/KR2017/000366
§ 371 (c)(1),
(2) Date: Aug. 3, 2018

(87) PCT Pub. No.: WO2017/135586
PCT Pub. Date: Aug. 10, 2017

(65) Prior Publication Data
US 2019/0056883 A1    Feb. 21, 2019

(30) Foreign Application Priority Data

Feb. 4, 2016  (KR) .................... 10-2016-0014183

(51) Int. Cl.
*G06F 3/06* (2006.01)
*G06F 12/126* (2016.01)
(Continued)

(52) U.S. Cl.
CPC .......... *G06F 3/0647* (2013.01); *G06F 3/0604* (2013.01); *G06F 3/0679* (2013.01);
(Continued)

(58) Field of Classification Search
CPC .... G06F 3/0604; G06F 3/0647; G06F 3/0679; G06F 12/08; G06F 12/0868;
(Continued)

(56) References Cited

U.S. PATENT DOCUMENTS

2003/0156454 A1  8/2003  Wei et al.
2013/0262738 A1  10/2013  Kwon et al.
(Continued)

FOREIGN PATENT DOCUMENTS

KR  10-2015-0094205 A   8/2015
KR  10-2015-0133084 A   11/2015
WO  WO-2015141731 A1 *  9/2015  ......... G06F 12/0864

*Primary Examiner* — Aracelis Ruiz
(74) *Attorney, Agent, or Firm* — Jefferson IP Law, LLP

(57) ABSTRACT

Various embodiments of the present invention relate to an apparatus and a method for managing memory in an electronic device. The electronic device comprises a volatile memory, a non-volatile memory and a processor, wherein the processor is configured to store first data and second data, stored in a first specified area of the volatile memory, in a second specified area of the volatile memory, to check the stored order of the first data and the second data stored in the second specified area, and to move at least one of the first data and the second data from the second specified area of the volatile memory to a third specified area of the non-volatile memory if the states of the first data and the second data satisfy a specified condition on the basis of the order. Other embodiments may be possible.

20 Claims, 19 Drawing Sheets

(51) Int. Cl.
  *G06F 12/0897* (2016.01)
  *G06F 12/08* (2016.01)
  *G06F 12/128* (2016.01)
  *G06F 12/0868* (2016.01)

(52) U.S. Cl.
  CPC .......... *G06F 12/08* (2013.01); *G06F 12/0897* (2013.01); *G06F 12/126* (2013.01); *G06F 12/128* (2013.01); *G06F 12/0868* (2013.01); *G06F 2212/1036* (2013.01); *G06F 2212/214* (2013.01); *G06F 2212/401* (2013.01); *G06F 2212/502* (2013.01)

(58) Field of Classification Search
  CPC .. G06F 12/0897; G06F 12/126; G06F 12/128; G06F 2212/1036; G06F 2212/214; G06F 2212/401; G06F 2212/502
  See application file for complete search history.

(56) References Cited

U.S. PATENT DOCUMENTS

| | | |
|---|---|---|
| 2014/0173243 A1 | 6/2014 | Devendran et al. |
| 2015/0324137 A1 | 11/2015 | Wu et al. |
| 2015/0331628 A1 | 11/2015 | Lee et al. |
| 2016/0224274 A1* | 8/2016 | Kato ................. G06F 12/0893 |
| 2016/0378671 A1* | 12/2016 | Takeda ................ G06F 12/0864 711/122 |

* cited by examiner

VOLATILE AND NONVOLATILE MEMORY MANAGEMENT METHOD AND ELECTRONIC DEVICE

TECHNICAL FIELD

Various embodiments of the present disclosure relate to a method for managing memory and an electronic device therefor.

BACKGROUND ART

An operating system of an electronic device such as a smart phone, a server, or the like allocates computing resources, such as a central processing unit (CPU), a volatile memory, or a nonvolatile memory, to an application program to execute the application program.

The operating system may support a virtual memory system using an on-demand memory allocation method, and accordingly, may allocate a virtual memory area to the application program, in addition to an area of the volatile memory used as a main memory device of the electronic device. For example, if the memory area of the main memory device is insufficient in the electronic device, the operating system may solve the memory insufficiency phenomenon by moving data of the memory area, pre-allocated to the application program, to a swap area of the nonvolatile memory used as an auxiliary memory device.

DETAILED DESCRIPTION OF THE INVENTION

Technical Objects

A small-sized electronic device such as a smart phone may use, as an auxiliary memory device, a nonvolatile memory having a limited lifetime, such as a flash memory (for example, an embedded multimedia card (eMMC), a universal flash storage (UFS)). However, if the nonvolatile memory of the limited lifetime is configured as a swap area, the lifetime of the nonvolatile memory may be reduced, and a processing speed of an electronic device may be reduced due to a delay caused by reading/writing operations of the nonvolatile memory.

Various embodiments of the present disclosure provide an apparatus and a method for managing memory using an area of a volatile memory and an area of a nonvolatile memory as a swap area in an electronic device.

Various embodiments provide an apparatus and a method for managing memory, which, when an area of a volatile memory and an area of a nonvolatile memory are used as a swap area, prevents a processing speed of an electronic device from being reduced.

Various embodiments provide an apparatus and a method for managing memory, which minimizes reduction of a lifetime of a nonvolatile memory used as a swap area in an electronic device.

Technical Solving Means

According to various embodiments of the present disclosure, an electronic device may include: a volatile memory; a nonvolatile memory; and a processor, and the processor may be configured to: store first data and second data which are stored in a first specified area of the volatile memory in a second specified area of the volatile memory; identify an order in which the first data and the second data are stored in the second specified area; and, when states of the first data and the second data satisfy a specified condition based on the order, move at least one of the first data and the second data from the second specified area of the volatile memory to a third specified area of the nonvolatile memory.

According to various embodiments of the present disclosure, an operating method of an electronic device may include: storing first data and second data which are stored in a first specified area of a volatile memory in a second specified area of the volatile memory; identifying an order in which the first data and the second data are stored in the second specified area; and, when states of the first data and the second data satisfy a specified condition based on the order, moving at least one of the first data and the second data from the second specified area of the volatile memory to a third specified area of a nonvolatile memory.

According to various embodiments of the present disclosure, a computer readable recording medium may include a program for performing: storing first data and second data which are stored in a first specified area of a volatile memory in a second specified area of the volatile memory; identifying an order in which the first data and the second data are stored in the second specified area; and, when states of the first data and the second data satisfy a specified condition based on the order, moving at least one of the first data and the second data from the second specified area of the volatile memory to a third specified area of a nonvolatile memory.

Advantageous Effect

An electronic device and an operating method thereof according to various embodiments of the present disclosure may move at least one data stored in a swap area of a volatile memory to a swap area of a nonvolatile memory, and store the data therein, such that the size of the swap area of the volatile memory can be reduced. In addition, the electronic device may allocate as many areas of the volatile memory as the reduced size to an application program, such that time required to allocate the memory to the application can be reduced. In addition, a probability that reading and/or writing on the swap area of the nonvolatile memory is performed in the electronic device can be reduced, and accordingly, a lifetime of the nonvolatile memory can be prevented from being reduced rapidly. In addition, a delay in a processing speed of the electronic device can be prevented, and a probability that a request for an additional volatile memory is made can be reduced.

BEST MODE FOR EMBODYING THE INVENTION

Figure 1:
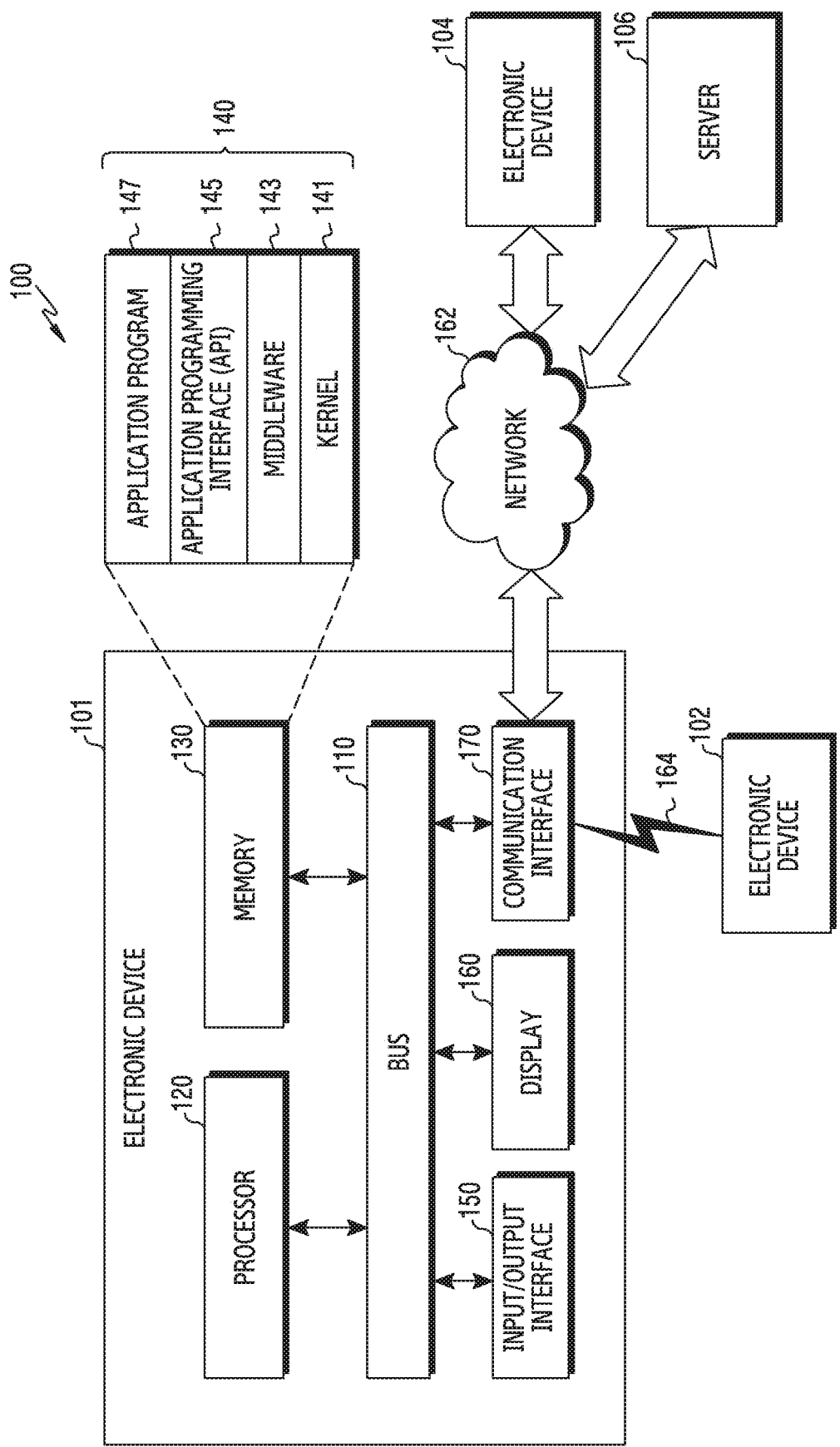
FIG. 1 is a view illustrating a network environment including an electronic device according to various embodiments of the present disclosure.

Hereinafter, various embodiments of the present disclosure will be described with reference to the accompanying drawings. The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices.

The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a view illustrating a network environment including an electronic device according to various embodiments of the present disclosure.

Referring to FIG. 1, the electronic device 101 may include a bus 110, a processor 120, a memory 130, an input/output interface 150, a display 160, and a communication interface 170. According to various embodiments of the present disclosure, the electronic device 101 may not include at least one of the above-described elements or may further include other element(s).

The bus 110 may interconnect the above-described elements (for example, the processor 120, the memory 130, the input/output interface 150, the display 160, or the communication interface 170), and may include a circuit for transmitting communications (for example, a control message and/or data) among the above-described elements.

The processor 120 may include one or more of a central processing unit (CPU), an application processor (AP), or a communication processor (CP). The processor 120 may perform, for example, an operation or data processing associated with control and/or communication of at least one other element(s) of the electronic device 101.

According to an embodiment, the processor 120 may detect a memory allocation request by execution of an application, and may allocate a portion of the memory 130 to the corresponding application. The processor 120 may allocate an area of a first area of a volatile memory that is not allocated to other applications to the application requested to be executed. According to various embodiments, the first area may be a system memory area which is specified to store a program and data associated with execution of the programs at least temporarily to execute the program.

According to an embodiment, when allocating the memory, the processor 120 may determine whether a primary swap is necessary based on an available capacity of the first area. For example, the processor 120 may compare a usable capacity of the first area and a first threshold capacity, and may determine whether the primary swap is necessary according to a result of comparing. The primary swap refers to moving data, stored in the first area of the volatile memory in the memory 130 at least temporarily, to a second area of the volatile memory, and storing the same therein. In another example, the primary swap may refer to copying data, stored in the first area of the volatile memory in the memory 130 at least temporarily, into the second area of the volatile memory, and releasing memory allocation of the first area. According to various embodiments, the second area may be a primary swap area which is specified to store a program that is not expected to be used at least temporarily, and data associated with execution of the program to secure an available capacity of the first area when the first area, which is a system memory area, is insufficient. According to an embodiment, data stored in the second area may be compressed data. For example, the second area may be a compressed memory pool in which data in the unit of page is compressed and stored. The second area may have a fixed size or a variable size. When the usable capacity of the first area is smaller than a first threshold capacity, the processor 120 may determine that the primary swap is necessary. When the primary swap is necessary, the processor 120 may compress data of at least one page stored in the first area of the volatile memory at least temporarily, and then move the compressed data to the second area of the volatile memory. The processor 120 may release previous allocation of a specific area of the first area, in which the data of at least one page moved to the second area has been stored, and may allocate the deallocated specific area to the application required to be executed. When the usable capacity of the first area is larger than or equal to the first threshold capacity, the processor 120 may determine that the primary swap is not necessary. When the primary swap is not necessary, the processor 120 may allocate the usable area of the first area to the corresponding application. The first threshold capacity may be fixed or may be variable according to an application required to be executed.

According to an embodiment, the processor 120 may determine whether a secondary swap is necessary based on the available capacity of the first area or a used capacity of the second area. For example, when the usable area of the first area is smaller than the first threshold capacity, the processor 120 may determine that the secondary swap is necessary. For example, the processor 120 may determine that the secondary swap is necessary at the time when the primary swap is expected to occur. In another example, when a used capacity of the second area is larger than or equal to a second threshold capacity, the processor 120 may determine that the secondary swap is necessary. The secondary swap refers to moving data, stored in the second area of the volatile memory in the memory 130 at least temporarily, to a third area of a nonvolatile memory, and storing the same therein. In another example, the secondary swap may refer to copying data, stored in the second area of the volatile memory in the memory 130 at least temporarily, into the third area of the nonvolatile memory, and releasing memory allocation of the second area. According to an embodiment, the third area may be a secondary swap area which is specified to store a program that is not expected to be used at least temporarily and data associated with execution of the program to secure an available capacity of the second area when the second area of the volatile memory is insufficient, and to store data related execution of the program. The third area may have a fixed size or a variable size.

According to an embodiment, when the usable capacity of the first area is smaller than the first threshold capacity or the used capacity of the second area is larger than or equal to the second threshold capacity, the processor 120 may determine that the secondary swap is necessary. When the secondary swap is necessary, the processor 120 may move at least one compressed data, stored in the second area of the volatile memory at least temporarily, to the third area of the nonvolatile memory. The processor 120 may release previous allocation of a specific area of the second area, in which the at least compressed data moved to the third area has been stored, and may store data moved from the first area by the primary swap in the specific area of the second area. When the usable capacity of the first area is larger than or equal to the first threshold capacity, or the used capacity of the second area is smaller than the second threshold capacity, the processor 120 may determine that the secondary swap is not necessary. The first threshold capacity and/or the second threshold capacity may be fixed or variable. According to an embodiment, the processor 120 may determine that the secondary swap is necessary by using a usable capacity of the second area instead of the used capacity of the second area.

According to an embodiment, the processor 120 may select data of at least one page that has not been used for the longest time from among pages of the first area for the primary swap. The processor 120 may compress the data of the at least one page selected in the first area, and may process the compressed data to be moved to the second area.

According to an embodiment, the processor 120 may select at least one compressed data from among the compressed data stored in the second area for the secondary swap. For example, the processor 120 may select at least one compressed data based on information indicating an order in which the compressed data is stored in the second area, and may move the selected at least one compressed data from the second area to the third area. The information indicating the order of storage may be a serial number or time information of compressed data assigned at the time when the compressed data is stored in the second area. According to an embodiment, the processor 120 may select data that has been stored in the second area for the longest time, data that is expected to stay in the second area for the longest time, data that has not been used in the second area for the longest time, or data that has a lowest frequency of use in the second area, based on the information indicating the order of storage of the compressed data stored in the second area.

According to an embodiment, the processor 120 may control data that is stored in the second area for the shortest time, data that is expected to stay in the second area for the shortest time, or data that has a highest frequency of use in the second area not to be moved from the second area to the third area, based on the information indicating the order of storage of the compressed data stored in the second area. For example, the processor 120 may prohibit data satisfying a specific condition from being moved from the second area to the third area at least temporarily.

According to an embodiment, the processor 120 may determine whether to move corresponding data to the secondary swap area, for example, to the third area, and to store the data, based on a capacity or a compression rate of the selected at least one compressed data. For example, when the capacity of the selected compressed data is larger than or equal to a threshold data capacity, the processor 120 may control the selected compressed data to be moved from the second area to the third area, and to be stored therein. When the capacity of the selected compressed data is smaller than the threshold data capacity, the processor 120 may control the selected compressed data not to be moved from the second area to the third area. For example, when the compression rate of the selected compressed data is higher than or equal to a threshold compression rate, the processor 120 may control the selected compressed data to be moved from the second area to the third area. In another example, when the compression rate of the selected compressed data is lower than the threshold compression rate, the processor 120 may control the selected compressed data not to be moved from the second area to the third area. According to an embodiment, the compression rate may be a rate of a size of the compressed data to an original size of the compressed data (size of compressed data/original size of compressed data). In the second area, compressed data having a high compression rate may occupy more areas than compressed data having a low compression rate. Accordingly, in an embodiment, when compressed data having a compression rate higher than the threshold compression rate is moved from the second area to the third area, more available areas may be obtained in the second area than when compressed data having a compression rate lower than or equal to the threshold compression rate is moved from the second area to the third area. Accordingly, in an embodiment, the processor 120 may select compressed data having a compression rate higher than the threshold compression rate, and may move the data from the second area to the third area.

According to an embodiment, the processor 120 may determine whether the secondary swap is possible based on a state of the nonvolatile memory. The state of the nonvolatile memory may include at least one of an available capacity of the third area, the cumulative number of times of recording (or writing) on the third area, a cumulative amount of recording on the third area, the cumulative number of times of recording on the entire nonvolatile memory, a cumulative amount of recording on the entire nonvolatile memory, or combinations thereof. The cumulative number of times of recording may refer to the total cumulative number of times of recording, or the cumulative number of times of recording during a predetermined period. The cumulative amount of recording may refer to the total cumulative amount of recording or the cumulative amount of recording during a predetermined period. When the available capacity of the third area is larger than or equal to a third threshold capacity, the processor 120 may determine that the secondary swap is possible, and may move at least one data selected in the second area to the third area. On the other hand, when the available capacity of the third area is smaller than the third threshold capacity, the processor 120 may determine that the secondary swap is impossible, and may prohibit at least one data selected in the second area from being moved to the third area at least temporarily. In another example, when the cumulative number of times of recording on the third area is smaller than a first threshold number of times of recording, the processor 120 may determine that the secondary swap is possible, and may move at least one data selected in the second area to the third area. On the other hand, when the cumulative number of times of recording on the third area is greater than or equal to the first threshold number of times of recording, the processor 120 may determine that the secondary swap is impossible, and may prohibit at least one data selected in the second area from being moved to the third area at least temporarily.

According to an embodiment, the processor 120 may control an active state of a secondary swap function based on lifetime information of the nonvolatile memory. The lifetime information of the nonvolatile memory may include at least one of the cumulative number of times of recording on the third area, the cumulative amount of recording on the third area, the cumulative number of times of recording on the entire nonvolatile memory, the cumulative amount of recording on the entire nonvolatile memory, or combinations thereof. When the cumulative number of times of recording on the third area is smaller than the first threshold number of times of recording, when the cumulative amount of recording on the third area is smaller than a first threshold amount of recording, when the cumulative number of times of recording on the entire nonvolatile memory is smaller than a second threshold number of times of recording, and/or when the cumulative amount of recording on the entire nonvolatile memory is smaller than a second threshold amount of recording, the processor 120 may activate the primary swap function. When the cumulative number of times of recording on the third area is larger than or equal to the first threshold number of times of recording, when the cumulative amount of recording on the third area is larger than or equal to the first threshold amount of recording, when the cumulative number of times of recording on the entire nonvolatile memory is larger than or equal to the second threshold number of times of recording, and/or when the cumulative amount of recording on the entire nonvolatile memory is larger than or equal to the second threshold amount of recording, the processor may inactivate the primary swap function. According to an embodiment, the processor 120 may control the active state of the secondary swap function when the operating system starts or after trying to perform the secondary swap.

According to an embodiment, the processor 120 may control the active state of the secondary swap function, based on the number of failures of the secondary swap. For example, the processor 120 may count an instance where the secondary swap is tried, but the secondary swap fails, and, when the counted number of failures is larger than or equal to a threshold number of failures, the processor 120 may inactivate the secondary swap function. According to an embodiment, the number of failures of the secondary swap may be initialized at predetermined intervals.

The memory 130 may include a volatile memory and a nonvolatile memory. The memory 130 may store commands or data associated with at least one other element(s) of the electronic device 101.

According to an embodiment, the memory 130 may include a volatile memory including a first area and a second area, and a nonvolatile memory including a third area. The first area may be a system memory area which is specified to store a program and data associated with execution of the program at least temporarily to execute the program. The second area may be a primary swap area which is specified to store a program that is not expected to be used at least temporarily, and data associated with execution of the program, to secure an available capacity of the first area when the first area, which is the system memory area, is insufficient. According to an embodiment, data stored in the second area may be compressed data. The third area may be a secondary swap area which is specified to store a program that is not expected to be used at least temporarily, and data associated with execution of the program, to secure an available capacity of the second area when the second area of the volatile memory is insufficient. The third area may store compressed data or may store decompressed data. The first area, the second area, and the third area may have fixed sizes or variable sizes.

According to an embodiment, the memory 130 may store software and/or a program 140. The program 140 may include, for example, a kernel 141, a middleware 143, an application programming interface (API) 145, or an application (or an application program) 147. At least a portion of the kernel 141, the middleware 143, or the API 145 may be called an "operating system (OS)."

The kernel 141 may control or manage system resources (for example, the bus 110, the processor 120, the memory 130, and the like) that are used to execute operations or functions of other programs (for example, the middleware 143, the API 145, or the application 147). Furthermore, the kernel 141 may provide an interface that allows the middleware 143, the API 145, or the application 147 to access discrete elements of the electronic device 101 so as to control or manage system resources. The kernel 141 may control or manage a primary swap task and a secondary swap task by using a swap program module to manage the memory. The kernel 141 may generate the secondary swap task based on lifetime information of the nonvolatile memory when the OS starts. Additionally, the kernel 141 may remove the secondary swap task based on the lifetime information of the nonvolatile memory.

The middleware 143 can, for example, perform a relay role of enabling the API 145 or the application program 147 to communicate and exchange data with the kernel 141. Also, the middleware 143 can process one or more work requests received from the application program 147 in accordance with the order of priority. For example, the middleware 143 can grant at least one of the application programs 147 the order of priority capable of using the system resources (e.g., the bus 110, the processor 120, the memory 130, etc.) of the electronic device 101, and may perform a scheduling and load balancing for the one or more work request by processing the one or more work requests.

The API 145 is, for example, an interface of enabling the application program 147 to control a function of the kernel 141 or the middleware 143, and can, for example, include at least one interface or function (e.g., instruction) for file control, window control, picture processing, character control, etc.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, or symbols) for the user. The display 160 may include a touch screen and receive, for example, a touch, gesture, proximity, or hovering input by using an electronic pen or the user's body part. Thus, the display 160 may be referred to as a touch screen. For example, the display 160 may be combined with a touch panel capable of detecting a touch input or a hovering input, thereby forming a single touch screen.

The communication interface 170 may set communication between, for example, the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, as a cellular communication protocol, at least one of, for example, long-term evolution (LTE), LTE Advanced (LTE-A), code division multiple access (CDMA), wideband CDMA (WCDMA), universal mobile telecommunications system (UMTS), wireless broadband (WiBro), or global system for mobile communications (GSM). In addition, the wireless communication may include short-range communication 164, for example. The short-range communication 164 may include at least one of, for example, wireless fidelity (WiFi), Bluetooth, Bluetooth low energy (BLE), Zigbee, near field communication (NFC), magnetic secure transmission, radio frequency (RF), or a body area network (BAN). According to an embodiment, the wireless communication may include global navigation satellite system (GNSS). The GNSS may be, for example, global positioning system (GPS), global navigation satellite system (Glonass), Beidou navigation satellite system (Beidou) or Galileo (the European global satellite-based navigation system). Hereinafter, "GPS" and "GNSS" may be interchangeably used in the present disclosure.

The wired communication may include at least one of, for example, a universal serial bus (USB), a high-definition multimedia interface (HDMI), a recommended standard-232 (RS-232), or a plain old telephone service (POTS). The network 162 may include at least one of telecommunications networks, for example, a computer network (for example, local area network (LAN) or wide area network (WAN)), an internet, or a telephone network.

Each of the first and second external electronic devices 102 and 104 may be a device which is the same as or different from the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
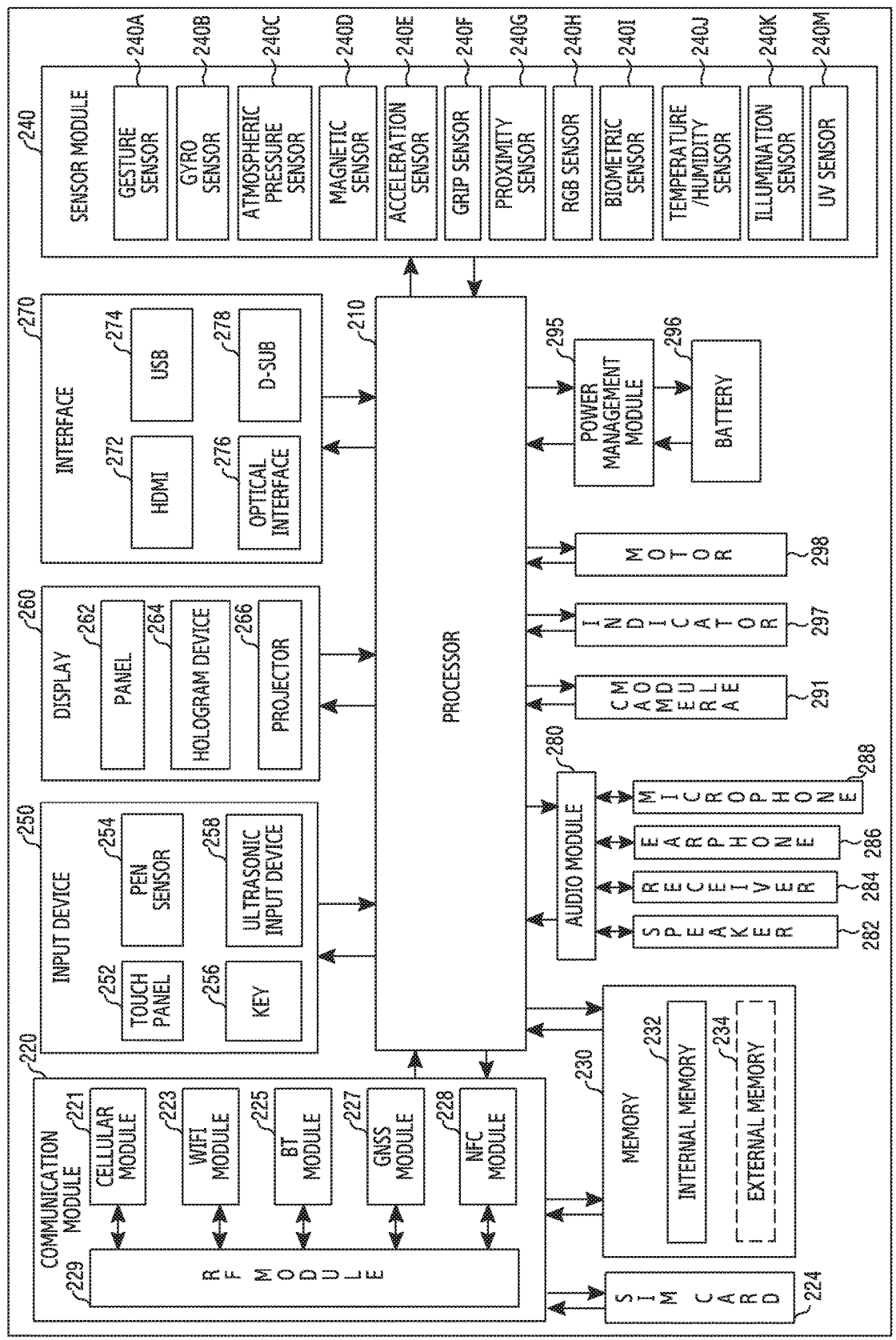
FIG. 2 is a block diagram illustrating an electronic device according to various embodiments of the present disclosure.

FIG. 2 illustrates a detailed block diagram of an electronic device according to an exemplary embodiment of the present disclosure. In the following description, the electronic device 201 may be, for example, the entire electronic device 100 illustrated in FIG. 1 or part of the electronic device 101. Referring to FIG. 2, the electronic device 201 may include one or more processors (for example, an AP) 210, a communication module 220, a subscriber identity module (SIM) 224, a memory 230, a sensor module 240, an input device 250, a display 260, an interface 270, an audio module 280, a camera module 291, a power management module 295, a battery 296, an indicator 297, and a motor 298.

The processor 210 may run, for example, an operating system (OS) or application program to control a plurality of hardware or software components connected to the processors 210 and may perform various kinds of data processing and operations. The processors 210 may be configured, for example, as a system on chip (SoC). According to one exemplary embodiment, the processors 210 may further include a graphic processing unit (GPU) and/or an image signal processor. The processors 210 may include at least part (for example, a cellular module 221) of the components illustrated in FIG. 2. The processors 210 may load a command or data received from at least one of other components (for example, a nonvolatile memory) into a volatile memory to process the command or data and may store various kinds of data in the nonvolatile memory. The processor 210 may perform a two-step swap function by using a portion of the volatile memory and a portion of the nonvolatile memory. For example, the processor 120 may move data that is stored in the first area of the volatile memory at least temporarily to the second area of the volatile memory, and may move data that satisfies a specified condition from among data stored in the second area of the volatile memory at least temporarily to the third area of the nonvolatile memory, and store the same therein.

The communication module 220 may have a configuration the same as or similar to that of the communication interface 170 in FIG. 1. The communication module 220 may include, for example, a cellular module 221, a Wi-Fi module 223, a Bluetooth module 225, a global navigation satellite system (GNSS) module 227 (for example, a global positioning system (GPS) module, a Glonass module, a Beidou module, or a Galileo module), a near field communication (NFC) module 228, and a radio frequency (RF) module 229.

The cellular module 221 may provide, for example, a voice call, a video call, a text message service, an Internet service, etc. through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP).

The Wi-Fi module 223, the BT module 225, the GNSS module 227, or the NFC module 228 may include, for example, a processor for processing data that is transmitted and received through the corresponding module. According to some embodiments, at least some (two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a power amplifier (amp) module (PAM), a frequency filter, a low noise amplifier (LNA), an antenna, or the like. According to another exemplary embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including an SIM and/or an embedded SIM and may include unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. For example, the internal memory 232 may include at least one of a volatile memory (for example, a dynamic random access memory (DRAM), a static RAM (SRAM), or a synchronous dynamic RAM (SDRAM)), and a nonvolatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash or a NOR flash), a hard drive, or a solid state drive (SSD)). According to an embodiment, the volatile memory may include a first area (for example, a system memory area) which is specified to store a program and data associated with execution of the program at least temporarily to execute the program. According to an embodiment, the volatile memory may include a second area (for example, a primary swap area) which is specified to store a program that is not expected to be used at least temporarily, and data associated with execution of the program, to secure an available capacity of the first area when the first area is insufficient. According to an embodiment, the nonvolatile memory may include a third area (for example, a secondary swap area) which is specified to store a program that is not expected to be used at least temporarily, and data associated with execution of the program, to secure an available capacity of the second area when the second area of the volatile memory is insufficient. The first area, the second area, and the third area may have fixed sizes or variable sizes.

The external memory 234 may further include a flash drive, for example, a compact flash (CF), a secure digital (SD), a micro secure digital (micro-SD), a mini secure digital (mini-SD), an extreme digital (xD), a multi-media card (MMC), a memory stick, or the like. The external memory 234 may be functionally and/or physically connected to the electronic device 201 through various interfaces.

The sensor module 240 may measure, for example, physical quantities or detect an operation state of the electronic device 201 and convert measured or detected information into an electrical signal. The sensor module 240 may include, for example, at least one of a gesture sensor 240A, a gyro sensor 240B, a barometric pressure sensor 240C (atmospheric pressure sensor), a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, a illumination sensor 240K, a ultra-violet (UV) sensor 240M, and a galvanic skin reflex (GRS) sensor 240N. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a force touch sensor, an ultrasonic sensor, and/or a fingerprint sensor. The sensor module 240 may further include a control circuit to control at least one or more sensors belonging thereto. In one exemplary embodiment, the electronic device 201 may further include a processor configured, as a part of the processors 210 or separately from the processors 210, to control the sensor module 240, thereby controlling the sensor module 240 while the processors 210 is in a sleep state.

The input device 250 may include, for example, a touch panel 252, a (digital) pen sensor 254, a key 256, or an ultrasonic input device 258. The touch panel 252 may use, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or include a separate recognition sheet. The key 256 may include, for example, a physical button, an optical key, or a keypad. The ultrasonic device 258 may detect ultrasonic waves generated in an input tool through a microphone (for example, a microphone 288) and identify data corresponding to the detected ultrasonic waves.

The display 260 (for example, a display 160) may include a panel 262, a hologram device 264, or a projector 266. The panel 262 may include a configuration that is the same as or similar to that of the display 160 of FIG. 1. The panel 262 may be configured, for example, to be flexible, transparent, or wearable. The panel 262 may be formed with the touch panel 252 in a single module. According to one exemplary embodiment, the panel 262 may include a pressure sensor (or force sensor) to measure the strength of pressure by a user touch. The pressure sensor may be configured in an integrated form with the touch panel 252 or be configured as one or more sensors separate from the touch panel 252. The hologram device 264 may display a three-dimensional image in the air using the interference of light. The projector 266 may project light onto a screen to display an image. The screen may be disposed, for example, inside or outside the electronic device 201. According to one exemplary embodiment, the display 260 may further include a control circuit to control the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/MMC interface, or an Infrared Data Association (IrDA) interface.

The audio module 280 may convert, for example, a sound and an electrical signal reciprocally. At least some components of the audio module 280 may be included, for example, in an input/output interface 150 illustrated in FIG. 1. The audio module 280 may process sound information input or output, for example, through a speaker 282, a receiver 284, earphones 286, or the microphone 288.

The camera module 291 is a device that takes, for example, a still image and a video. According to one exemplary embodiment, the camera module 291 may include one or more image sensors (for example, a front sensor or a rear sensor), a lens, an image signal processor (ISP), or a flash (for example, an LED, a xenon lamp, or the like).

The power management module 295 may manage, for example, the power of the electronic device 201. According to one exemplary embodiment, the power management module 295 may include a power management integrated circuit (PMIC), a charger integrated circuit (IC), or a battery or fuel gauge. The power management module 295 may be supplied with power from the outside via a cable and/or wirelessly. For example, the power management module 295 may be supplied with power from the outside using a wireless charging method, such as a magnetic resonance method, a magnetic induction method, or an electromagnetic wave method. The power management module 295 may further include an additional circuit, such as a coil loop, a resonance circuit, or a rectifier, to be supplied with power wirelessly. The battery gauge may measure, for example, the remaining battery charge, the charging voltage, the current, or temperature of the battery 296.

The battery 296 may include, for example, a rechargeable battery and/or a solar battery. According to one exemplary embodiment, the battery 296 may include a plurality of cells connectable in series or in parallel.

The indicator 297 may display a specific state of the electronic device 201 or a component thereof (for example, the processors 210), for example, a booting state, a message state, or a charging state. The motor 298 may convert an electrical signal into mechanical vibrations and may generate vibrations or a haptic effect. Although not shown, the electronic device 201 may include a processing device for supporting a mobile TV (for example, a GPU). The processing device for supporting the mobile TV may process media data in accordance with digital multimedia broadcasting (DMB), digital video broadcasting (DVB), or mediaFlo™ standards.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
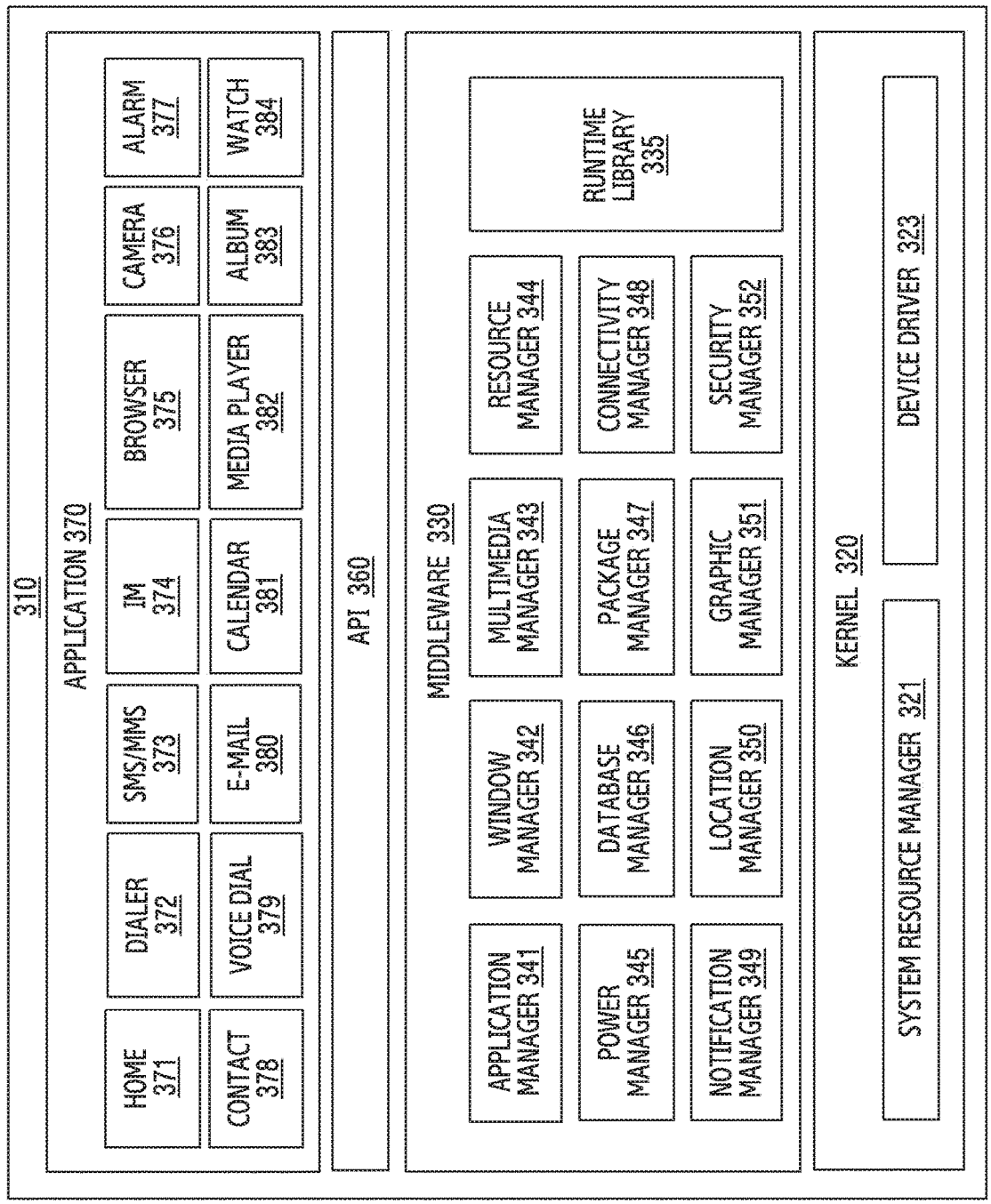
FIG. 3 is a block diagram illustrating a program module according to various embodiments of the present disclosure.

FIG. 3 illustrates a block diagram of a program module according to various exemplary embodiments. According to one exemplary embodiment, the program module 310 (e.g., the program 140) can include an Operating System (OS) controlling resources related to an electronic device (e.g., the electronic device 101), and/or various applications (e.g., the application program 147) run on the operating system. The operating system can, for example, include Android™, iOS™, Windows™, Symbian™, Tizen™, or Bada™.

Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least some of the program module 310 can be preloaded onto an electronic device, or can be downloaded from an external electronic device (e.g., the electronic device 102, 104, the server 106, etc.).

The kernel 320 can, for example, include a system resource manager 321 and/or a device driver 323. The system resource manager 321 can perform the control of system resources, the allocation thereof, or the recovery thereof. According to one exemplary embodiment, the system resource manager 321 can include a process management unit, a memory management unit, or a file system management unit. The device driver 323 can, for example, include a display driver, a camera driver, a Bluetooth driver, a shared memory driver, a USB driver, a keypad driver, a WiFi driver, an audio driver, or an Inter-Process Communication (IPC) driver. The system resource manager 321 may allocate at least a portion of the volatile memory to an application, or may collect the at least portion of the volatile memory allocated to the application. According to an embodiment, the system resource manager 321 may detect a lack of capacity in the system memory to be allocated to an application, and may perform a primary swap and/or secondary swap by interworking with the device driver 323. The device driver 323 may perform the primary swap of moving data stored in the first area of the volatile memory at least temporarily to the second area of the volatile memory. In addition, the device driver 323 may perform the secondary swap of moving data stored in the second area of the volatile memory at least temporarily to the third area of the nonvolatile memory. In addition, the device driver 323 may move data stored in the third area at least temporarily to the first area.

The middleware 330 may provide functions which are commonly required by the application 370 or may provide various functions to the application 370 through the API 360, such that the application 370 can efficiently use limited system resources in the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 3552, or a transmission manager 353.

For example, the runtime library 335 may include a library module which is used by a compiler to add a new function through a programming language while the application 370 is executed. The runtime library 335 may perform input/output management, memory management, or an arithmetic function.

The application manager 341, for example, may manage the life cycle of at least one of the applications 370. The window manager 342 may manage GUI resources used on a screen. The multimedia manager 343 may identify a format to be used to play media files, and may encode or decode a media file using a codec appropriate for a corresponding format. The resource manager 344 may manage resources, such as a source code of at least one of the applications 370, a memory, or a storage space.

The power manager 345, for example, may manage a battery or power by interworking with a basic input/output system (BIOS), and may provide power information necessary for the operation of the electronic device. According to an embodiment, the power manager 345 may control to provide charging or discharging of the battery in at least one of a wired manner or a wireless manner.

The database manager 346 may generate, search, or change a database to be used by at least one of the applications 370. The package manager 347 may manage installation or update of an application that is distributed in the form of a package file.

The connectivity manager 348, for example, may manage a wireless connection such as WiFi or Bluetooth. The notification manager 349 may display or notify an event such as a received message, appointment, notification of proximity to a user, in such a manner that the event does not hinder a user. The location manager 350 may manage locational information of the electronic device. The graphic manager 351 may manage graphic effects to be offered to a user or a user interface related to the graphic effects. The security manager 352 may provide an overall security function necessary for system security or user authentication.

According to an embodiment, when the electronic device (for example, the electronic device 101) includes a telephone function, the middleware 330 may further include a telephony manager to manage an application or a video telephony function of the electronic device.

The middleware 330 may include a middleware module to form a combination of the various functions of the above-described elements. The middleware 330 may provide a module which is customized according to a kind of an OS to provide a differentiated function. In addition, the middleware 330 may dynamically delete a portion of the existing elements or may add new elements.

The API 360 (for example, the API 145) may be, for example, a set of API programming functions and may be provided as a different configuration according to an OS. For example, in the case of Android or iOS, a single API set may be provided for each platform. In the case of Tizen, two or more API sets may be provided for each platform.

The application 370 (for example, the application 147) may include, for example, home 371, dialer 372, short message service (SMS)/multimedia messaging service (MMS) 373, instant message (IM) 374, browser 375, camera 376, alarm 377, contact 378, application dial 379, email 380, calendar 381, media player 382, album 383, watch 384, one or more health care (e.g., for measuring the degree of workout or blood sugar), or environmental information (e.g., for measuring air pressure, humidity, or temperature information) providing applications.

According to an embodiment, the application 370 may include an application that supports information exchange between the electronic device (for example, the electronic device 101) and an external electronic device (for example, the electronic device 102, 104) (hereinafter, referred to as "an information exchanging application" for convenience of explanation). The information exchange application, for example, may include a notification relay application adapted to transfer specific information to the external electronic device or a device management application adapted to manage the external electronic device.

For example, the notification relay application may transfer notification information occurring at another application of the electronic device (for example, the SMS/MMS application, the email application, the healthcare application, or the environmental information application) to the external electronic device (for example, the electronic device 102, 104). In addition, the notification relay application, for example, may receive notification information from the external electronic device and provide the notification information to a user.

The device management application, for example, may manage (for example, install, delete, or update) at least one function (e.g., turn-on or turn-off of the external electronic device (or some components), or adjustment of brightness (or resolution) of the display) of the external electronic device (for example, the electronic device 102, 104) communicating with the electronic device, an application running on the external electronic device, or a service (for example, a telephony service or a message service) provided on the external electronic device.

According to an embodiment, the application 370 may include a preloaded application or a third party application that can be downloaded from a server. The names of the elements of the program module 310 illustrated may vary according to a kind of an operating system.

According to various embodiments, at least a portion of the program module 310 may be implemented by software, firmware, hardware, or a combination of two or more thereof. At least a portion of the program module 310 may be implemented (for example, executed) by, for example, a processor (for example, the processor 210). At least a portion of the program module 310 may include, for example, modules, programs, routines, sets of instructions, or processes for performing one or more functions.

Figure 4:
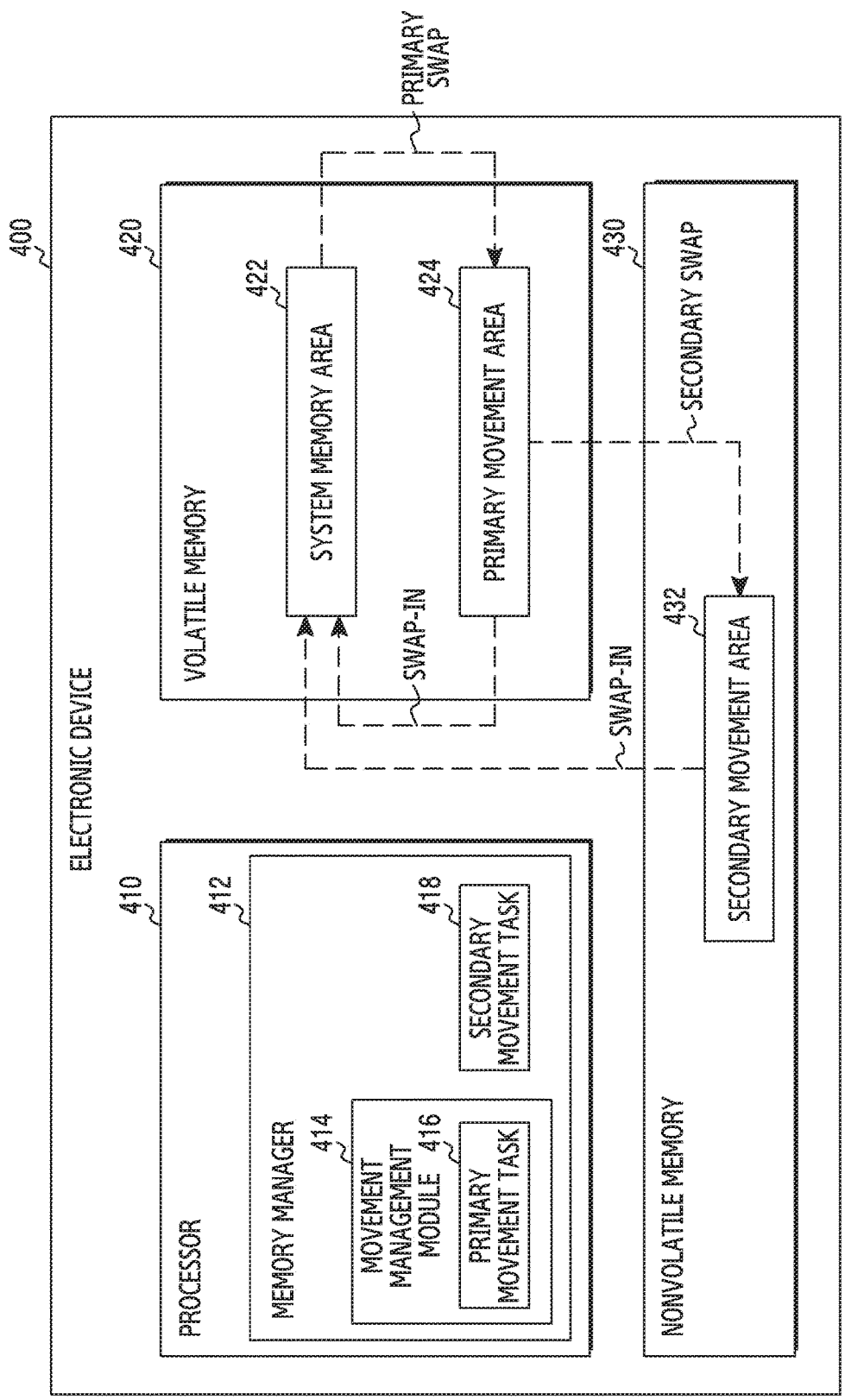
FIG. 4 is a block diagram illustrating an electronic device including a volatile memory and a nonvolatile memory according to various embodiments of the present disclosure.
Figure 5:
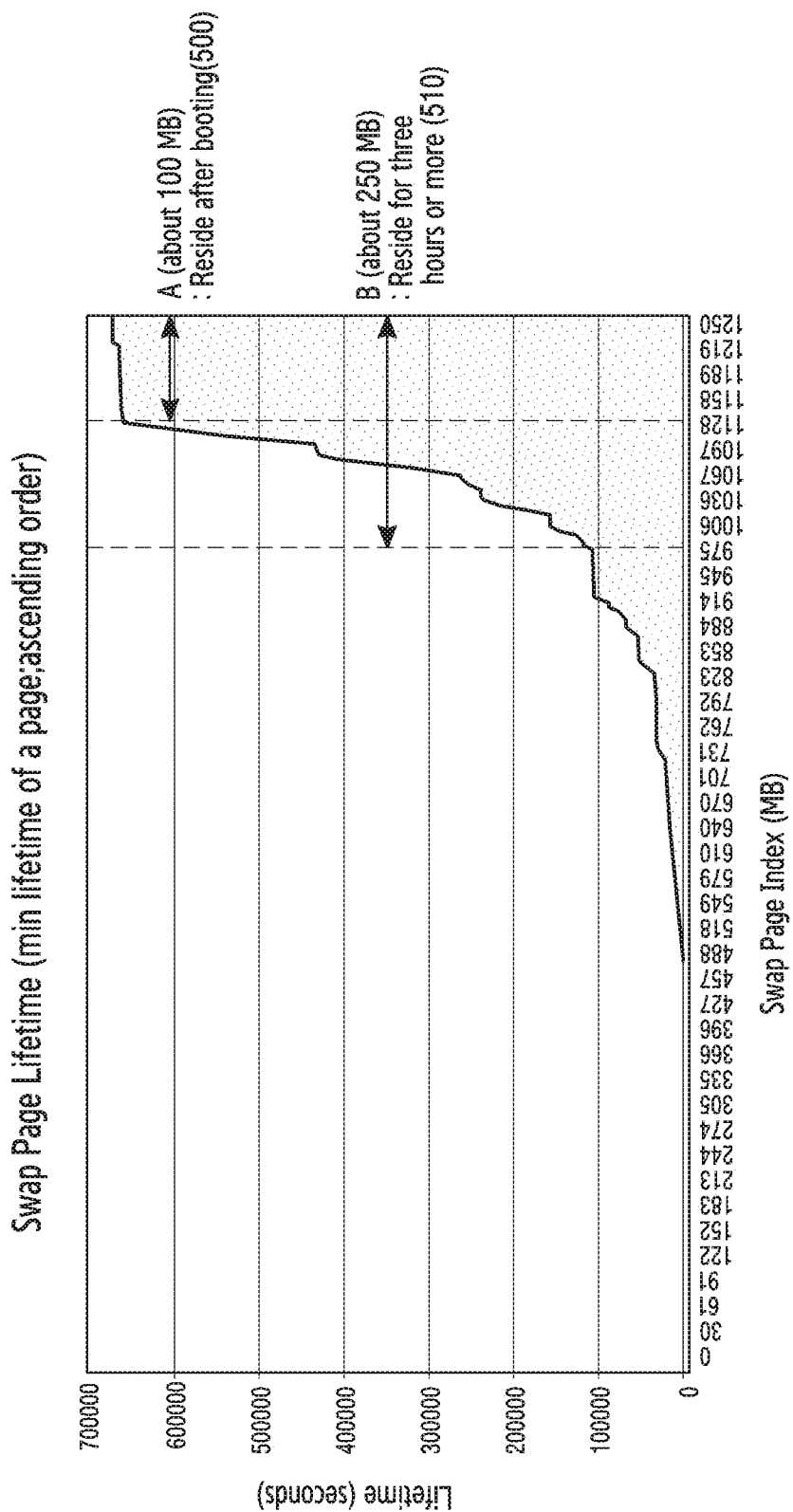
FIG. 5 is a view illustrating lifetime of data stored in a primary movement area of a volatile memory of an electronic device according to various embodiments of the present disclosure.

FIG. 4 is a block diagram illustrating an electronic device including a volatile memory and a nonvolatile memory according to various embodiments of the present disclosure. Hereinafter, various embodiments of FIG. 4 will be described with reference to FIG. 5. FIG. 5 illustrates lifetime of data stored in a primary movement area of the volatile memory of the electronic device according to various embodiments of the present disclosure. Referring to FIG. 4, the electronic device 400 may include a processor 410, a volatile memory 420, and a nonvolatile memory 430.

According to various embodiments, the processor 410 may be the processor 120 of FIG. 1 and the processor 210 of FIG. 2. According to an embodiment, the processor 410 may include a memory manager 412. The memory manager 412 may detect a memory allocation request accompanied by execution of an application, and may allocate at least a portion of a system memory area 422 in the volatile memory 420 to the corresponding application. In addition, the memory manager 412 may detect termination of execution of the application or a lack of an available capacity of the system memory area 422, and may deallocate the portion of the system memory area 422 allocated to the corresponding application.

According to various embodiments, the memory manager 412 may include a movement management module 414. When the available capacity of the system memory area 422 is smaller than or equal to a first threshold capacity, the movement management module 414 may determine that the system memory area 422 is insufficient, and may determine to perform a primary swap to move data of the system memory 422 to a primary movement area 424. The first threshold capacity may be a fixed value or a variable value. For example, the first threshold capacity may be always a constant value, and may be changed according to an application which is requested to be executed. For example, the first threshold capacity may be set to 20 megabyte (MB). This value is merely an example for convenience of explanation, and various embodiments of the present disclosure are not limited thereto. The movement management module 414, for example, may activate a primary movement task 416 when the available capacity of the system memory area 422 is smaller than or equal to the first threshold capacity. The movement management module 414 may select a page that has not been used for the longest time from among pages of the system memory area 422 by using the primary movement task 416, and may move data of the selected page to the primary movement area 424. For example, the movement management module 414 may scan a page of a system memory area and may select at least one page that has not been used for the longest time.

According to various embodiments, the primary movement task 416 may compress the data of the page selected in the system memory area 422, and then move the compressed data to the primary movement area 424. According to an embodiment, the primary movement task 416 may compress the data of the page by using a well-known algorithm such as a Lempel-Ziv-Oberh umer (LZO) algorithm or an LZO Variant (LZ4) algorithm In various embodiments of the present disclosure, when data of the system memory area 422 is moved to the primary movement area 424, the data selected in the system memory area 422 is compressed. However, various embodiments of the present disclosure are not limited thereto. For example, the primary movement task 416 may not compress the data of the page selected in the system memory area 422, and may move the uncompressed page data to the primary movement area 424. According to an embodiment, a unit of the data moved from the system memory area 422 to the primary movement area 424 by the primary movement task 416 may be a page, but is not limited thereto. For example, the data moved from the system memory area 422 to the primary movement area 424 by the primary movement task 416 may be a unit corresponding to multiples of page or a process unit.

According to various embodiments, the movement management module 414 may generate a secondary movement task 418 when an operating system starts. For example, the movement management module 414 may determine whether to activate a secondary swap function to move data of the primary movement area 424 to a secondary movement area 432, based on lifetime information of the nonvolatile memory 430 or lifetime information of the secondary movement area 432 of the nonvolatile memory 430. When the lifetime information of the nonvolatile memory 430 or the lifetime information of the secondary movement area 432 of the nonvolatile memory 430 satisfies a specified lifetime condition, the movement management module 414 may determine to activate the secondary swap function, and may generate the secondary movement task 418. When the lifetime information of the nonvolatile memory 430 or the lifetime information of the secondary movement area 432 of the nonvolatile memory 430 does not satisfy the specified lifetime condition, the movement management module 414 may determine to inactivate the primary swap function, and may inactivate the secondary movement task 418. According to an embodiment, the specified lifetime condition may be the cumulative number of times of recording during a specified period, or a cumulative amount of recording during the specified period. For example, the specified lifetime condition may be "period: 1 day, the cumulative number of times of recording: 250000 times," or "period: 1 day, the cumulative amount of recording: 1 GigaByte (GB)." This is merely an example, and various embodiments of the present disclosure are not limited thereto.

According to various embodiments, when a used capacity of the second area 424 is larger than or equal to a second threshold capacity, and/or when the available capacity of the system memory area 422 is smaller than or equal to the first threshold capacity, the movement management module 414 may determine to perform the secondary swap. For example, the second threshold capacity may be set to a capacity corresponding to about 20% of the total capacity of the volatile memory 420. For example, when the total capacity of the volatile memory 420 is 512 MB, the first threshold capacity may be set to 100 MB. However, these numerical values are merely an example for convenience of explanation, and various embodiments of the present disclosure are not limited thereto. According to an embodiment, the movement management module 414 may determine whether to perform the secondary swap by using an available capacity of the second area instead of the used capacity of the second area 424. According to an embodiment, the movement management module 414 may select at least one compressed data that satisfies the specified condition from among the compressed data stored in the primary movement area 424 at least temporarily, and may move the selected compressed data to the secondary movement area 432 by using the secondary movement task 418.

According to various embodiment, the secondary movement task 418 may select at least one compressed data, based on storage order information regarding the compressed data stored in the primary movement area 424 at least temporarily. According to an embodiment, the storage order information may be serial numbers or time information of the compressed data. The serial number or time information of the compressed data stored in the primary movement area 424 may indicate how long the corresponding compressed data has been stored in the primary movement area 424, how long the corresponding compressed data has not been used, how long the corresponding compressed data is expected to be stored in the primary movement area 424, or a frequency of use of the corresponding compressed data. For example, the secondary movement task 418 may identify that compressed data having a low serial number has been stored in the primary movement area 424 for a longer time, has not been used for a long timer, is expected to be stored for a longer time, and has a low frequency of use, in comparison to compressed data having a high serial number.

FIG. 5 is a view illustrating lifetime of data stored in a movement area of the volatile memory of the electronic device according to various embodiments.

Referring to FIG. 5, data of about 100 megabyte (MB) from among data stored in the primary movement area 424 of the volatile memory 420 continuously resides (500) in the primary movement area 424 from the time of booting, and data of about 250 MB resides (510) in the primary movement area 424 for 3 hours or more from the time of booting. Based on data lifetime shown in FIG. 5, it is expected that the data of about 250 MB stored in the primary movement area 424 will not be moved to the system memory area 422 (for example, swap-in) for 3 hours, and the data of about 100 MB will not be moved to the system memory area 411 for a long time. Accordingly, the secondary movement task 418 according to various embodiments may select at least one compressed data that is expected to reside in the primary movement area 424 for a long time, based on the storage order information of the compressed data stored in the primary movement area 424 at least temporarily, and may move the selected compressed data to the secondary movement area 432. In this way, a probability that data stored in the secondary movement area 432 is moved to the system memory area 422 can be minimized while collecting at least a portion of the primary movement area 424, and through this, the number of times of reading on the secondary movement area 432 can be reduced, and the lifetime of the secondary movement area 432 can be prevented from being reduced within a short time.

According to various embodiments, the secondary movement task 418 may determine a reference value for selecting compressed data stored in the primary movement area 424, and may select at least one compressed data by using the reference value and the storage order information of the data stored in the primary movement area 424. According to an embodiment, the secondary movement task 418 may determine a first threshold value based on the serial numbers of the compressed data stored in the primary movement area 424, and may select at least one compressed data having a serial number lower than or equal to the determined first threshold value.

According to another embodiment, the secondary movement task 418 may determine a first threshold number, and may select as many compressed data as the first threshold number from among the compressed data stored in the primary movement area 424, based on the serial numbers of the compressed data stored in the primary movement area 424. The first threshold number may be calculated based on the serial numbers, or may be a pre-specified value. According to still another embodiment, the secondary movement task 418 may determine a first threshold time based on the time information of the compressed data stored in the primary movement area 424, and may select at least one compressed data having time information shorter than or equal to the determined first threshold time. According to yet another embodiment, the secondary movement task 418 may determine a first threshold number, and may select as many compressed data as the determined first threshold number from among the compressed data stored in the primary movement area 424, based on the time information of the compressed data stored in the primary movement area 424. The first threshold number may be calculated based on the time information or may be a pre-specified value. According to further embodiment, the secondary movement task 418 may determine a first threshold memory size, and may select compressed data that corresponds to the determined first threshold memory size from among the compressed data stored in the primary movement area 424, based on the serial numbers of the compressed data stored in the primary movement area 424, or the stored time information. For example, the secondary movement task 418 may select as many compressed data as the first threshold memory size or a similar memory size from among the compressed data stored in the primary movement area 424, in order from the data of a smallest serial number or time information. According still further embodiment, the secondary movement task 418 may select at least one compressed data from among the compressed data stored in the primary movement area 424 by using an LRU algorithm According to various embodiments, the secondary movement task 418 may prohibit at least one compressed data that satisfies another specified condition from among the compressed data stored in the primary movement area 424 at least temporarily, from being moved to the secondary movement area 432. According to an embodiment, the secondary movement task 418 may determine a second threshold value based on the serial numbers of the compressed data stored in the primary movement area 424, and may process to prevent at least one compressed data having a serial number higher than or equal to the second threshold value from being moved to the secondary movement area 432. According to an embodiment, the secondary movement task 418 may determine a second threshold time based on the time information of the compressed data stored in the primary movement area 424, and may process to prevent at least one compressed data having time information larger than or equal to the determined second threshold time from being moved to the secondary movement area 432.

According to various embodiments, the secondary movement task 418 may determine whether to move the selected at least one compressed data to the secondary movement area 432, based on a compression rate of the at least one compressed data selected in the primary movement area 424. For example, when the compression rate of the selected compressed data is higher than or equal to a threshold compression rate, the secondary movement task 418 may move the selected compressed data from the primary movement area 424 to the secondary movement area 432. In another example, when the compression rate of the selected compressed data is lower than the threshold compression rate, the secondary movement task 418 may process to prevent the selected compressed data from being moved from the primary movement area 424 to the secondary movement area 432. When only the compressed data having the compression rate higher than the threshold compression rate is moved to the secondary movement area 432, more available areas may be obtained in the primary movement area 424 than when compressed data having a compression rate lower than the threshold compression rate is moved to the secondary movement area 432.

According to various embodiments, the secondary movement task 418 may move at least one compressed data stored in the primary movement area 424 to the secondary movement area 432 as it is, and may store the same. The secondary movement task 418, for example, may not decompress the at least one compressed data stored in the primary movement area 424, and may store the compressed data in the secondary movement area 432. According to another embodiment, the secondary movement task 418 may decompress the at least one compressed data stored in the primary movement area 424, and then may move the decompressed data to the secondary movement area 432 and may store the same therein. By decompressing and storing as described above, a delay can be prevented from occurring due to a decompressing operation when the corresponding data is moved from the secondary movement area 432 to the system memory area 422 of the volatile memory 420 afterward.

According to various embodiments, the secondary movement task 418 may determine whether the secondary swap is possible based on available capacity information or lifetime information of the nonvolatile memory 430. For example, the secondary movement task 418 may compare an available capacity of the nonvolatile memory 430 (for example, an available capacity of the secondary movement area of the nonvolatile memory 430), and a third threshold capacity, and, when the available capacity is larger than or equal to the third threshold capacity, the secondary movement task 418 may move at least one compressed data stored in the primary movement area 424 to the secondary movement area 432, and may store the same therein. On the other hand, when the available capacity of the nonvolatile memory 430 (for example, the available capacity of the secondary movement area of the nonvolatile memory 430) is smaller than the third threshold capacity, the secondary movement task 418 may process movement of the at least one compressed data stored in the primary movement area 424 as failing. According to an embodiment, the third threshold capacity may be a specified value in the electronic device, or may be a value which is changed according to the lifetime information of the nonvolatile memory 430, which will be described below. For example, the third threshold value may be a value specified to 0 MB. This numerical value is merely an example for convenience of explanation, and various embodiments of the present disclosure are not limited thereto. In another example, the secondary movement task 418 may compare lifetime information of the nonvolatile memory 430 and a predetermined lifetime condition, and, when the lifetime information satisfies the predetermined lifetime condition, the secondary movement task 418 may move at least one compressed data stored in the primary movement area 424 to the secondary movement area 432, and may store the same therein. On the other hand, when the lifetime information of the nonvolatile memory 430 does not satisfy the predetermined lifetime condition, the secondary movement task 418 may process movement of at least one compressed data stored in the primary movement area 424 as failing. The lifetime information of the nonvolatile memory 430 may include at least one of the cumulative number of times of recording (or writing) on the secondary movement area 432, the cumulative amount of recording on the secondary movement area 432, the cumulative number of times of recording on the entre nonvolatile memory 430, and the cumulative amount of recording on the entire nonvolatile memory 432. The cumulative number of times of recording may refer to the total cumulative number of times of recording or the cumulative number of times of recording during a predetermined period. The cumulative amount of recording may refer to the total cumulative amount of recording or the cumulative amount of recording during a predetermined period.

According to various embodiments, the secondary movement task 418 may control an activation state of the secondary swap function based on the number of failures of the secondary swap. For example, the secondary movement task 418 counts an instance in which the secondary swap is tried during a predetermined period, but fails, and when the number of failures counted during the predetermined period is larger than or equal to a threshold number of failures, the secondary movement task 418 may inactivate the secondary swap function. The secondary movement task 418 may initialize the number of failures of the secondary swap when a predetermined period passes, and may activate the secondary swap function.

According to various embodiment, the movement management module 414 may control the active state of the secondary swap function, based on the lifetime information of the nonvolatile memory 430 when an operating system starts or after the secondary swap is tried. For example, when the cumulative number of times of recording on the secondary movement area 432 is smaller than a first threshold number of times of recording, when the cumulative amount of recording on the secondary movement area 432 is smaller than a first threshold amount of recording, when the cumulative number of times of recording on the entire nonvolatile memory 430 is smaller than a second threshold number of times of recording, and/or when the cumulative amount of recording on the entire nonvolatile memory 430 is smaller than a second threshold amount of recording, the movement management module 414 may activate the secondary movement task 418, and thus may activate the secondary swap function. On the other hand, when the cumulative number of times of recording on the secondary movement area 432 is larger than or equal to the first threshold number of times of recording, when the cumulative amount of recording on the secondary movement area 432 is larger than or equal to the first threshold amount of recording, when the cumulative number of times of recording on the entire nonvolatile memory 430 is larger than or equal to the second threshold number of times of recording, and/or when the cumulative amount of recording on the entire nonvolatile memory 430 is larger than or equal to the second threshold amount of recording, the movement management module 414 may inactivate the secondary movement task 418, and may inactivate the secondary swap function.

According to various embodiments, the movement management module 414 may move (or return) data stored in the primary movement area 424 to the system memory area 422 by using the primary movement task 416. According to various embodiments, the movement management module 414 may move (or return) data stored in the secondary movement area 432 to the system memory area 422 by using the secondary movement task 418. In various embodiments of the present disclosure, an operation of moving data stored in the primary movement area 424 or the secondary movement area 432 to the system memory area 422 may be referred to as a swap-in. Additionally, an operation of moving data of the system memory area 422 to the primary movement area 424, and/or an operation of moving data stored in the primary movement area 424 to the secondary movement area 432 may be referred to as a swap-out.

In various embodiments of the present disclosure, when data is moved from a specific area to another area by the swap-out and/or swap-in, the corresponding data may be deleted from the specific area. In various embodiments of the present disclosure, when data is moved from a specific area to another area by the swap-out and/or swap-in, the movement management module 414 may delete address mapping information of the specific area in which the corresponding data has been stored from an address mapping database, or may update the address mapping information. According to an embodiment, the address mapping database may include directly accessible address information of each data stored in each area. Alternatively, the address mapping database may include an index of each data stored in each area and a table for converting each index into real address information. The movement management module 414 may delete address mapping information of a specific area, and thereby may recognize that data stored at the corresponding address does not exist. For example, when first data stored in a specific area of the primary movement area 424 is moved to the secondary movement area 432, the move management module 414 may delete address mapping information of the first data from an address mapping database, in which information on data stored in the primary movement area 424 and address information of each data are mapped onto each other, and thereby may recognize that data does not exist in the specific area. In another example, when second data stored in a specific area of the secondary movement area 432 is moved to the system memory area 422, the movement management module 414 may delete address mapping information of the second data from an address mapping database, in which information on data stored in the secondary movement area 432 and address information of each data are mapped onto each other, and thereby may recognize that data does not exist in the specific area. Additionally, when a specific application is terminated, the movement management module 414 may delete address mapping information of a specific area in which data corresponding to the terminated specific application from among the data stored in the secondary movement area 432 is stored.

The volatile memory 420 may include the system memory area 422 which is specified to store a program and data associated with execution of the program at least temporarily to execute the program, and the primary movement area 424 which is specified to store a program that is not expected to be used at least temporarily, and data associated with execution of the program, to secure an available capacity of the system memory area 422. The system memory area 422 may be the first area of FIG. 1, and the primary movement area 424 may be a compressed memory pool in which data (for example, data in the unit of page) is compressed and stored, and may be the second area of FIG. 1. Respective sizes or capacities of the system memory area 422 and the primary movement area 424 may be fixed or may be variable. The primary movement area 424 may be formed of physically continuous memory areas, or may be formed of physically discontinuous memory areas.

The nonvolatile memory 430 may include the secondary movement area 432 which is specified to store a program that is not expected to be used at least temporarily, and data associated with execution of the program, to secure an available capacity of the primary movement area 424 of the volatile memory. The size or capacity of the secondary movement area 432 may be fixed or variable. The secondary movement area 432 may be managed by a file system. The secondary movement area 432 may be formed of physically continuous memory areas, or may be formed of physically discontinuous memory areas.

Figure 6:
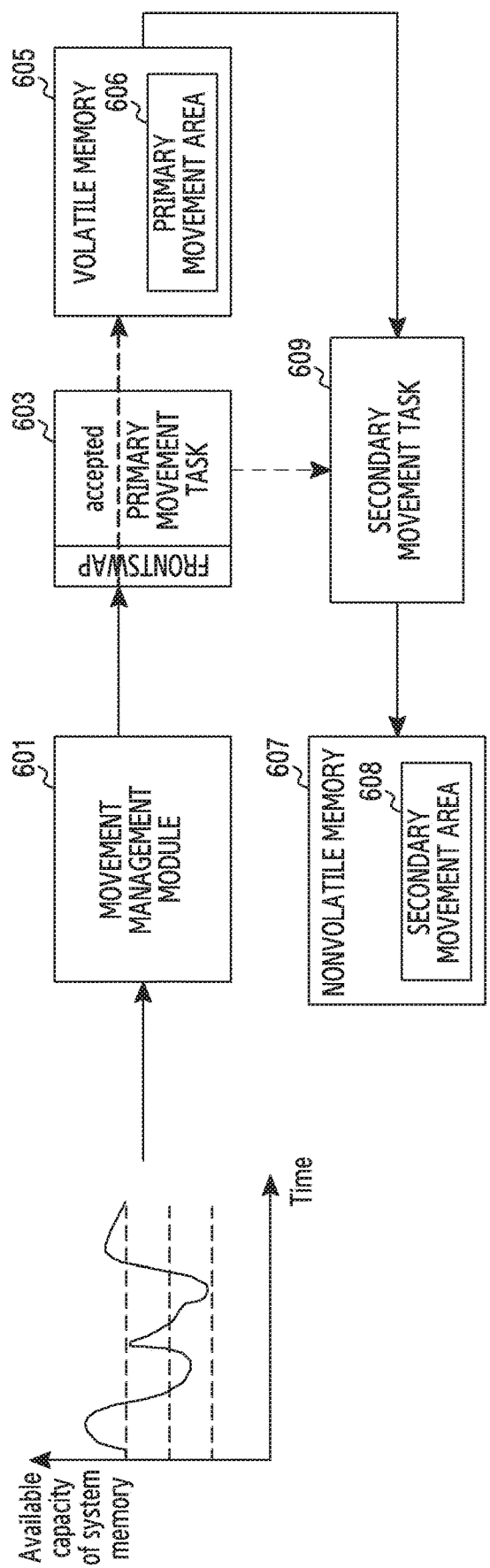
FIG. 6 is a view illustrating a two-step swap operation of an electronic device according to various embodiments of the present disclosure.

FIG. 6 is a view illustrating a two-step swap operation of an electronic device according to various embodiments of the present disclosure.

Referring to FIG. 6, a movement management module 601 (for example, the movement management module 414) may monitor a change in an available capacity of a system memory area (for example, the system memory area 422) of a volatile memory 605 (for example, the volatile memory 420), and, when the available capacity of the system memory area is smaller than a first threshold capacity, the movement management module 601 may activate a primary movement task 603 (for example, the primary movement task 416). The movement management module 601 may compress data of at least one page stored in the system memory area of the volatile memory 605, and then may move the compressed data to a primary movement area 601 (for example, the primary movement area 424) of the volatile memory 605 by using the primary movement task 603. According to an embodiment, the movement management module 601 may be referred to as "kernel swap demon (KSW APD)," and the primary movement task may be referred to as "compressed swap (ZSWAP)" or "compressed random access memory block device (Zram)." However, embodiments of the present disclosure are not limited thereto.

According to an embodiment, the movement management module 601 may generate a secondary movement task 609 (for example, the secondary movement task 418) through the primary movement task 603, and may control an active state of a secondary swap function by using the secondary movement task 609. According to an embodiment, the secondary movement task may be referred to as "writeback." However, embodiments of the present disclosure are not limited thereto. The secondary movement task 609 may move data that satisfies a specific condition in the primary movement area 606 of the volatile memory 605 to a secondary movement area 608 (for example, the secondary movement area 432) of a nonvolatile memory 607 (for example, the nonvolatile memory 430). According to an embodiment, the secondary movement task 609 may move data compressed and stored in the primary movement area 606 to the secondary movement area 608 as it is (for example, without decompressing the data). According to another embodiments, the secondary movement task 609 may decompress data compressed and stored in the primary movement area 606, and may move the decompressed data to the secondary movement area 608.

Figure 7:
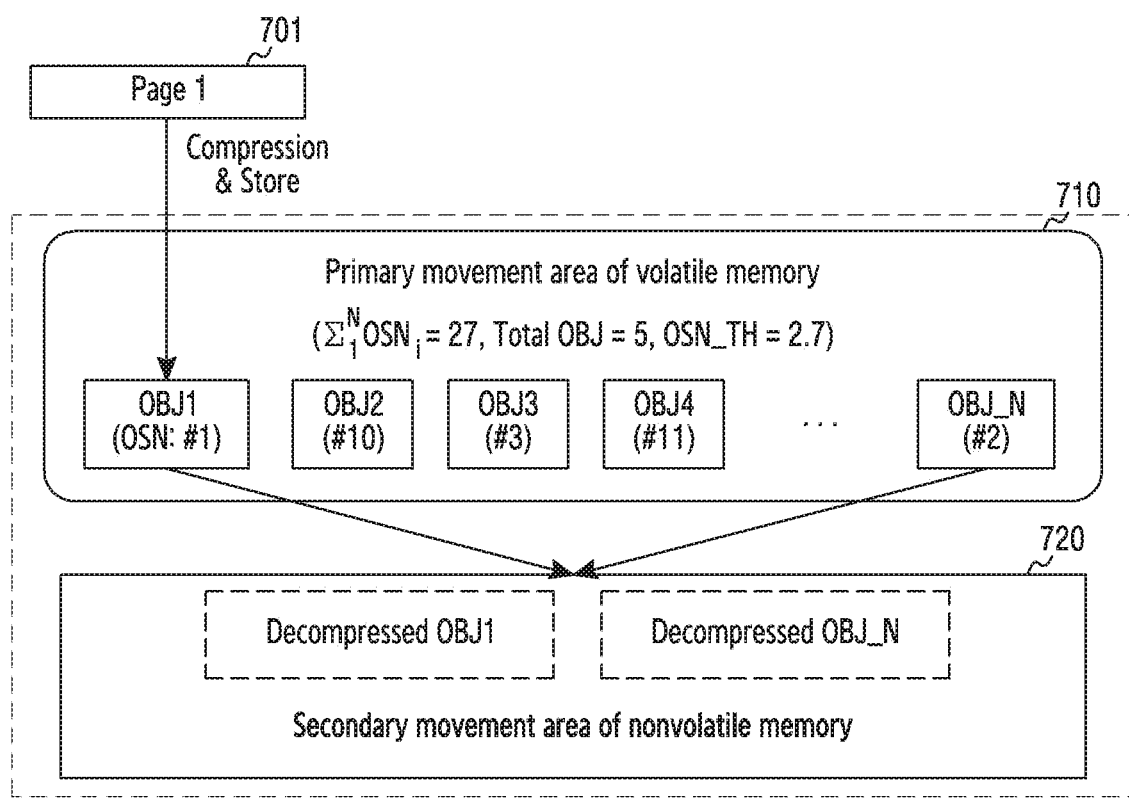
FIG. 7 is a view illustrating a secondary swap operation in an electronic device according to various embodiments of the present disclosure.

FIG. 7 is a view illustratively depicting a secondary swap operation in an electronic device according to various embodiments of the present disclosure. This is implemented according to an embodiment, and the secondary swap operation in various embodiments of the present disclosure is not limited thereto.

Referring to FIG. 7, an object 1 OBJ1, an object 2 OBJ2, an object 3 OBJ3, an object 4 (OBJ3), and an object N(OBJN), which are compressed data, may be stored in a primary movement area 701 of a volatile memory according to an embodiment. Serial numbers 1, 10, 3, 11, 2 may be assigned to the respective objects. According to various embodiments, the objects stored in the primary movement area 710 may be data that is moved from a system memory area to the primary movement area 710 (for example, a primary swap). According to various embodiments, the objects stored in the primary movement area 710 may be data that has been moved from the system memory area to the primary movement area 710, and has been compressed or encrypted.

The secondary movement task 418, 609 may determine a first threshold value based on the serial numbers. For example, the secondary movement task 418, 609 may determine the first threshold value by using Equation 1 presented below:

$$TH = \frac{\sum_{1}^{N} Seq_i}{2N} \qquad \text{Equation 1}$$

According to an embodiment, in Equation 1, TH is a first threshold value, N is the number of objects stored in the primary movement area 701, and $Seq_i$ is a serial number of an object i. For example, the secondary movement task 418, 609 may calculate the first threshold value as 2.7 based on Equation 1, may select the object 1 and the object N having serial numbers smaller than 2.7, and may move the selected object 1 and object N to the secondary movement area 720 of the nonvolatile memory. In this case, the compressed object 1 and object N may be decompressed by the secondary movement task 418, and then may be stored in the secondary movement area 720. In the embodiment of FIG. 7, the first threshold value is determined by using Equation 1, but various embodiments of the present disclosure are not limited thereto.

Figure 8:
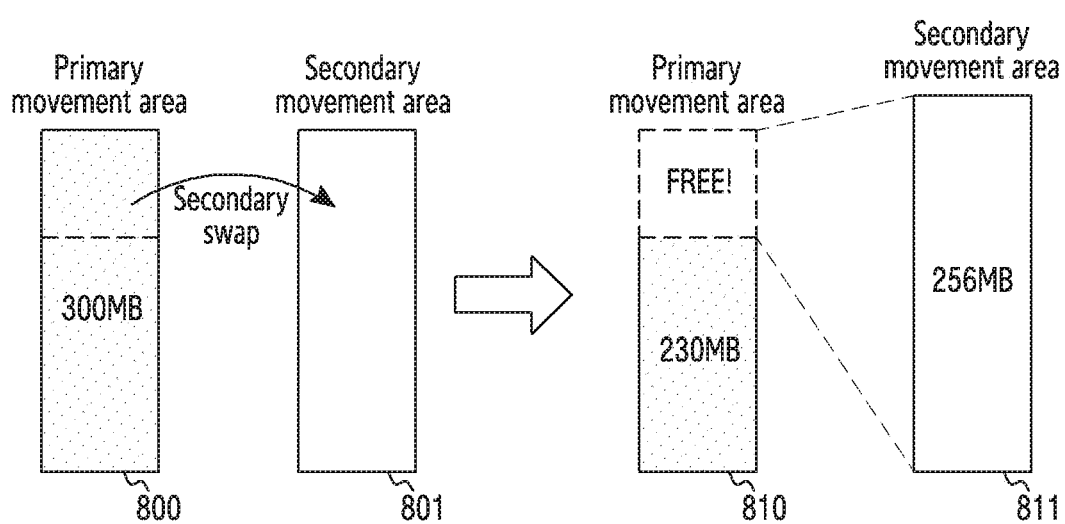
FIG. 8 is a view illustrating a gain of a volatile memory obtained by a secondary swap operation in an electronic device according to various embodiments of the present disclosure.

FIG. 8 is a view illustrating a gain of a volatile memory obtained by a secondary swap in the electronic device according to various embodiments of the present disclosure.

As shown in FIG. 8, the secondary movement task 418, 609 may decompress data of 70 MB out of data of 300 MB stored in a primary movement area 800, and then may move the data to a secondary movement area 801 and store the same therein. The data is decompressed by the secondary movement task 418, such that the size of the data stored in a secondary movement area 801, 256 MB, is larger than the compressed size 70 MB. However, by decompressing and storing the data described above, a delay can be prevented from occurring due to a decompressing operation when the corresponding data is moved to the system memory area 422 of the volatile memory 420, 505 from the secondary movement area 432, 608 afterward.

According to various embodiments of the present disclosure as described above, an electronic device may include: a volatile memory; a nonvolatile memory; and a processor, and the processor may be configured to: store first data and second data which are stored in a first specified area of the volatile memory in a second specified area of the volatile memory; identify an order in which the first data and the second data are stored in the second specified area; and, when states of the first data and the second data satisfy a specified condition based on the order, move at least one of the first data and the second data from the second specified area of the volatile memory to a third specified area of the nonvolatile memory.

According to various embodiments, the specified condition may include a time at which data is stored in the second specified area, an estimated time at which data is to be stored in the second specified area, a frequency of use of data, a last using time of data, or a combination thereof.

According to various embodiments, when states of the first data and the second data satisfy another specified condition, the processor may be configured to prohibit the first data and the second data from being moved from the second specified area of the volatile memory to the third specified area of the nonvolatile memory at least temporarily.

According to various embodiments, another specified condition may include a time at which data is stored in the second specified area, an estimate time at which data is to be stored in the second specified area, a frequency of use of data, a last using time of data, or a combination thereof.

According to various embodiments, the processor may be configured to: identify at least one of capacities and compression rates of the first data and the second data; and determine states of the first data and the second data further based on at least one of the capacity and the compression rate.

According to various embodiments, the processor may be configured to: identify a time at which the first data and the second data are stored in the volatile memory; and to determine states of the first data and the second data further based on the time at which the data is stored.

According to various embodiments, the first data and the second data which are stored in the second specified area may include compressed data, and the processor may be configured to generate decompressed data by using at least a portion of the compressed data, as at least a portion of the moving operation, and to store the decompressed data in the third specified area of the nonvolatile memory.

According to various embodiments, the first specified area may include an area which stores uncompressed data at least temporarily, and the second specified area may include an area which stores compressed data at least temporarily.

According to various embodiments, the processor may be configured to move the first data and the second data from the first specified area to the second specified area, based on a usable capacity of the first specified area.

According to various embodiments, the processor may be configured to: detect an event for moving data from the second specified area to the third specified area, based on a usable capacity of the first specified area or a usable capacity of the second specified area; and move at least one of the first data and the second data that satisfies the specified condition to the third specified area, at least based on the detecting operation.

According to various embodiments, the processor may be configured to identify a state of the nonvolatile memory, and, when the state of the nonvolatile memory satisfies another specified condition, to move at least one data of the first data and the second data that satisfies another specified condition from the second specified area of the volatile memory to the third specified area of the nonvolatile memory.

According to various embodiments, when the state of the nonvolatile memory does not satisfy another specified condition, the processor may be configured to prohibit the first data and the second data from being moved from the second specified area of the volatile memory to the third specified area of the nonvolatile memory at least temporarily.

According to various embodiments, the state of the memory may include a usable capacity of the third specified area, a lifetime of the third specified area, a lifetime of the nonvolatile memory, or a combination thereof.

According to various embodiments, the processor may be configured to select one of the first data and the second data according to the specified condition, and to move the selected one data from the second specified area to the third specified area.

Figure 9:
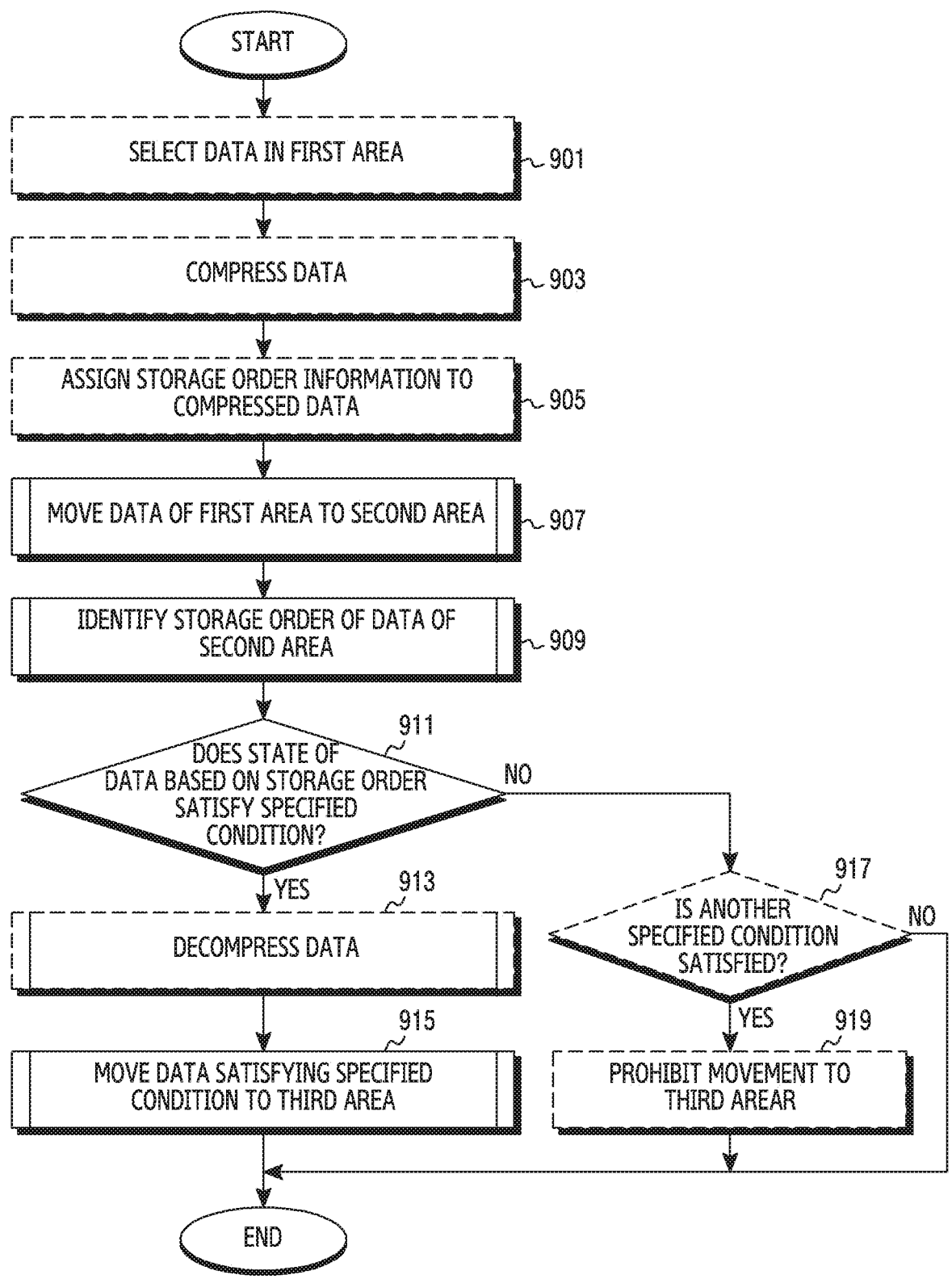
FIG. 9 is a flowchart illustrating an operating procedure of an electronic device according to various embodiments of the present disclosure.

FIG. 9 is a flowchart illustrating an operating procedure of an electronic device according to various embodiments of the present disclosure. In the following embodiment, respective operations may be performed in sequence, but may not necessarily be performed in sequence. For example, the order of respective operations may be changed and at least two operations may be performed in parallel. In FIG. 9, operations illustrated by dashed blocks may be omitted according to an embodiment.

Referring to FIG. 9, in operation 901, the electronic device may select data stored in the first area. For example, the electronic device may select data of at least one page that has not been used for the longest time from among page data of the first area. According to an embodiment, the electronic device may select data in the unit corresponding to multiples of page, data in the unit of processor, or data in other units, rather than data in the unit of page.

In operation 903, the electronic device may compress the selected data. For example, the electronic device may compress the data of the page by using a well-known algorithm such as an LZO algorithm or an LZ4 algorithm In operation 905, the electronic device may assign storage order information to the compressed data. For example, the electronic device may identify a serial number or time information on the compressed data. The serial number or time information may indicate an order in which the compressed data of the electronic device is stored in the second area. For example, when the maximum value of the serial numbers assigned to the data stored in the second area of the electronic device at least temporarily until the present time is 20, the electronic device may assign serial number 21 to the compressed data. Alternatively, the electronic device may assign time information indicating a time at which the compressed data is stored in the second area.

In operation 907, the electronic device may move the data selected in the first area to the second area. For example, the electronic device may move first data and second data which are selected from data stored in a first specified area of the volatile memory to a second specified area of the volatile memory, and may store the same therein. The first area (or the first specified area) may be a system memory area that is specified to store a program and data associated with execution of the program at least temporarily to execute the program in the electronic device. In addition, the second area (or the second specified area) may be a primary swap area which is specified to store a program that is not expected to be used at least temporarily, and data associated with execution of the program, to secure an available capacity of the first specified area when the first specified area is insufficient. In an embodiment, data stored in the second area may be compressed data. For example, the electronic device may compress first page data and second page data which are selected from data stored in the first area of the volatile memory, and then may move the compressed data to the second area and store the same therein. Additionally, when the available capacity of the first area is smaller than or equal to a first threshold capacity, the electronic device may move data of the first area to the second area, and may store the same therein. According to an embodiment, the electronic device may delete the data moved to the second area from the first area. Alternatively, the electronic device may delete address mapping information of the data moved to the second area from an address mapping database indicating address information of data stored in the first area.

In operation 909, the electronic device may identify an order of storage of data of the second area. For example, the electronic device may identify order information of the first data and the second data stored in the second specified area. For example, the electronic device may identify serial numbers assigned to the first data and the second data according to the order of storage at the time when the first data and the second data are stored in the second area. Alternatively, the electronic device may identify time information assigned to the first data and the second data at the time when the first data and the second data are stored in the second area. According to an embodiment, when a used capacity of the second area is larger than or equal to a second threshold capacity, or the available capacity of the first area is smaller than or equal to the first threshold capacity, the electronic device may determine that an event for moving data stored in the second area to another area occurs, and may identify the order of storage of data stored in the second area.

In operation 911, the electronic device may determine whether states of data based on the identified storage order satisfy a specified condition. For example, the electronic device may determine whether states of the first data and the second data satisfy the specified condition, based on the storage order of the first data and the storage order of the second data stored in the second specified area. According to an embodiment, the specified condition may be determined based on information on the storage order of data stored in the second area. For example, the electronic device may specify a condition based on the serial numbers or time information of the data stored in the second area, and may determine whether the first data and the second data satisfy the specified condition. For example, the electronic device may determine whether each data is data which has been stored in the second area of the volatile memory for a predetermined time or more, data which is expected to be stored in the second area of the volatile memory for a predetermined time or more, data which has not been used for a predetermined time or more, or data which has a frequency of use lower than or equal to a threshold, based on the serial numbers or time information of the data stored in the second area. According to an embodiment, the specified condition may be a compression rate of data stored in the second area. For example, the electronic device may determine whether the compression rate of the data stored in the second area satisfies a specified compression rate.

When the states of the data based on the storage order satisfy the specified condition, the electronic device may decompress the data that satisfies the specified condition in operation 913. For example, the electronic device may decompress the first data and the second data satisfying the specified condition from among the data stored in the second area.

In operation 915, the electronic device may move the data satisfying the specified condition to the third area. For example, when the states of the first data and the second data satisfy the specified condition, the electronic device may move at least one of the first data and the second data from the second specified area of the volatile memory to a third specified area of the nonvolatile memory, and may store the same therein. The first data and the second data moved to the third specified area may be data that is decompressed in operation 913. The third area (or the third specified area) may be a secondary swap area which is specified to store a program that is not expected to be used at least temporarily, and data associated with execution of the program, to secure the available capacity of the first area or the second area when the first area or the second area of the volatile memory is insufficient. According to various embodiments, the electronic device may further identify an available capacity of the third area of the nonvolatile memory, and, when the available area of the third area is larger than or equal to a third threshold capacity, the electronic device may determine that it is possible to move to the third area, and may move the data satisfying the specified condition to the third area. According to an embodiment, when the cumulative number of times of recording on the third area of the nonvolatile memory satisfies a threshold number of times of recording or the cumulative amount of recording on the third area of the nonvolatile memory satisfies a threshold amount of recording, the electronic device may determine that it is possible to move data to the third area, and may move the data satisfying the specified condition to the third area.

When the states of the data based on the storage order do not satisfy the specified condition, the electronic device may determine whether the states of the data stored in the second area satisfy another specified condition in operation 917. For example, the electronic device may determine whether states of the data stored in the second area satisfy another specified condition based on the storage order of the data stored in the second area. According to an embodiment, another specified condition may be determined based on the information on the storage order of the data stored in the second area. For example, the electronic device may specify another condition based on the serial numbers or time information of the data stored in the second area, and may determine whether the first data and the second data satisfy another specified condition. For example, the electronic device may determine whether each data is data which has been stored in the second area of the volatile memory for a predetermined time or less, data which is not expected to be stored in the second area of the volatile memory for a predetermined time or more, data which is expected to be used within a predetermined time, or data which has a frequency of use higher than or equal to a threshold, based on the serial numbers or time information of the data stored in the second area.

In operation 919, the electronic device may prohibit at least one data satisfying another specified condition from being moved to the third area. For example, the electronic device may prohibit data that has been stored in the second area for a short time or is expected to be stored in the second area only for a short time, from among the data stored in the second area, from being moved to the third area of the nonvolatile memory at least temporarily.

In the embodiment of FIG. 9, the electronic device may compress the data selected in the first area and then move the compressed data to the second area. However, according to various embodiments, the electronic device may not compress the data selected in the first area, and may move the uncompressed data to the second area. In addition, in the embodiment of FIG. 9, the electronic device may decompress the data satisfying the specified condition, and then may move the decompressed data to the third area of the nonvolatile memory. However, according to various embodiments, the electronic device may not decompress the data satisfying the specified condition, and may move the compressed data to the third area of the nonvolatile memory. However, if the data is decompressed, a delay can be prevented from occurring due to a decompressing operation when the electronic device moves data stored in the third area of the nonvolatile memory to the first area of the volatile memory afterward.

Figure 10:
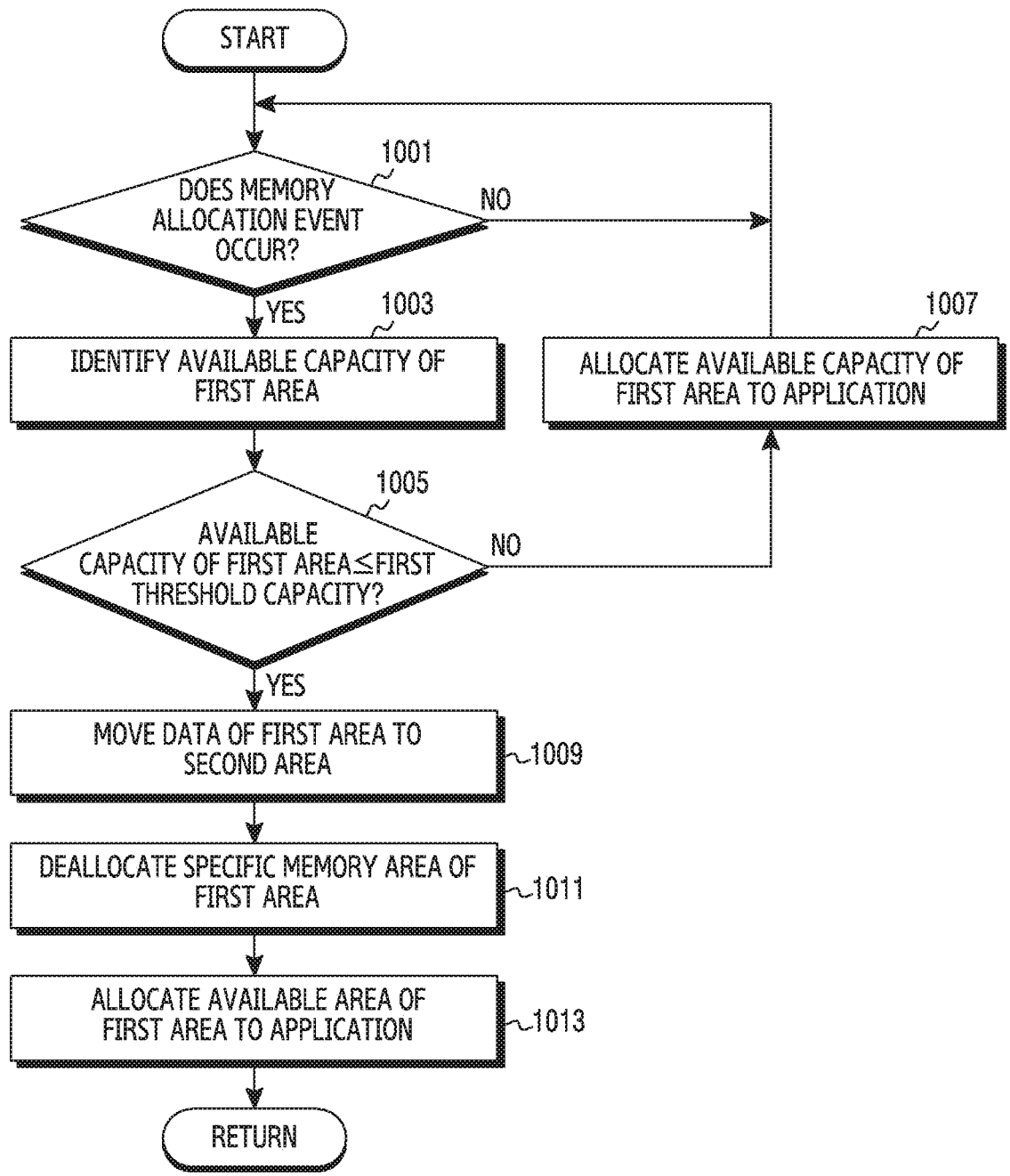
FIG. 10 is a flowchart illustrating a primary swap and allocation of a memory in the electronic device according to various embodiments of the present disclosure.

FIG. 10 is a flowchart illustrating a primary swap and allocation of a memory in the electronic device according to various embodiments of the present disclosure. In the following embodiment, respective operations may be performed in sequence, but may not necessarily be performed in sequence. For example, the order of respective operations may be changed and at least two operations may be performed in parallel.

Referring to FIG. 10, the electronic device may determine whether a memory allocation event occurs in operation 1001. For example, the electronic device may detect whether a memory allocation is requested by execution of an application, and may determine that the memory allocation event occurs when the memory allocation is requested. For example, when a user input of requesting execution of a first application is detected, the electronic device may detect a request for allocation of the first area of the volatile memory to execute the first application.

When the memory allocation event occurs, the electronic device may identify an available capacity of the first area in operation 1003. For example, the electronic device may identify a usable capacity of the first area of the volatile memory that is not currently allocated to other application.

In operation 1005, the electronic device may determine whether the available capacity of the first area is smaller than or equal to a first threshold capacity. For example, the electronic device may determine whether the usable capacity of the first area of the volatile memory is smaller than or equal to the first threshold capacity, by comparing the usable capacity of the first area of the volatile memory and the first threshold capacity. The first threshold capacity may be fixed or variable. For example, the first threshold capacity may be changed according to a memory capacity required by an application requesting memory allocation.

When the available capacity of the first area is smaller than or equal to the first threshold capacity, the electronic device may move data of the first area to the second area in operation 1009. For example, when the available capacity of the first area is smaller than or equal to the first threshold capacity, the electronic device may determine that it is impossible to allocate the first area since the currently usable capacity in the first area of the volatile memory is smaller than a memory capacity required by the application. To secure the usable capacity of the first area, the electronic device may select at least one data from data stored in the first area, and may move the selected at least one data to the second area. According to an embodiment, the electronic device may compress data stored in the first area, may assign storage order information to the compressed data, and then may move the data to the second area. According to another embodiment, the electronic device may not compress data stored in the first area, may assign storage order information to the uncompressed data, and then may move the data to the second area.

In operation 1011, the electronic device may deallocate a specific memory area of the first area. For example, the electronic device may deallocate the specific memory area of the first area in which the at least one data moved from the first area to the second area has been stored. For example, the electronic device may delete data stored in the specific memory area of the first area. Alternatively, the electronic device may delete address mapping information of the specific memory area of the first area, in which the data moved to the second area has been stored, from an address mapping database indicating address information of the data stored in the first area.

In operation 1013, the electronic device may allocate the available area of the first area to the application. For example, the electronic device may secure the memory capacity required by the application requesting memory allocation in the first area by deallocating the specific memory area of the first area, and thus may allocate the available area of the first area corresponding to the memory capacity required by the corresponding application to the corresponding application.

When the available capacity of the first area is larger than the first threshold capacity, the electronic device may allocate the available capacity of the first area to the application in operation 1007. For example, when the available capacity of the first area is larger than the first threshold capacity, the electronic device may determine that it is possible to allocate the first area since the currently usable capacity in the first area of the volatile memory is larger than or equal to the memory capacity required by the application. The electronic device may allocate the available capacity of the first area corresponding to the memory capacity required by the corresponding application to the corresponding application.

Figure 11A:
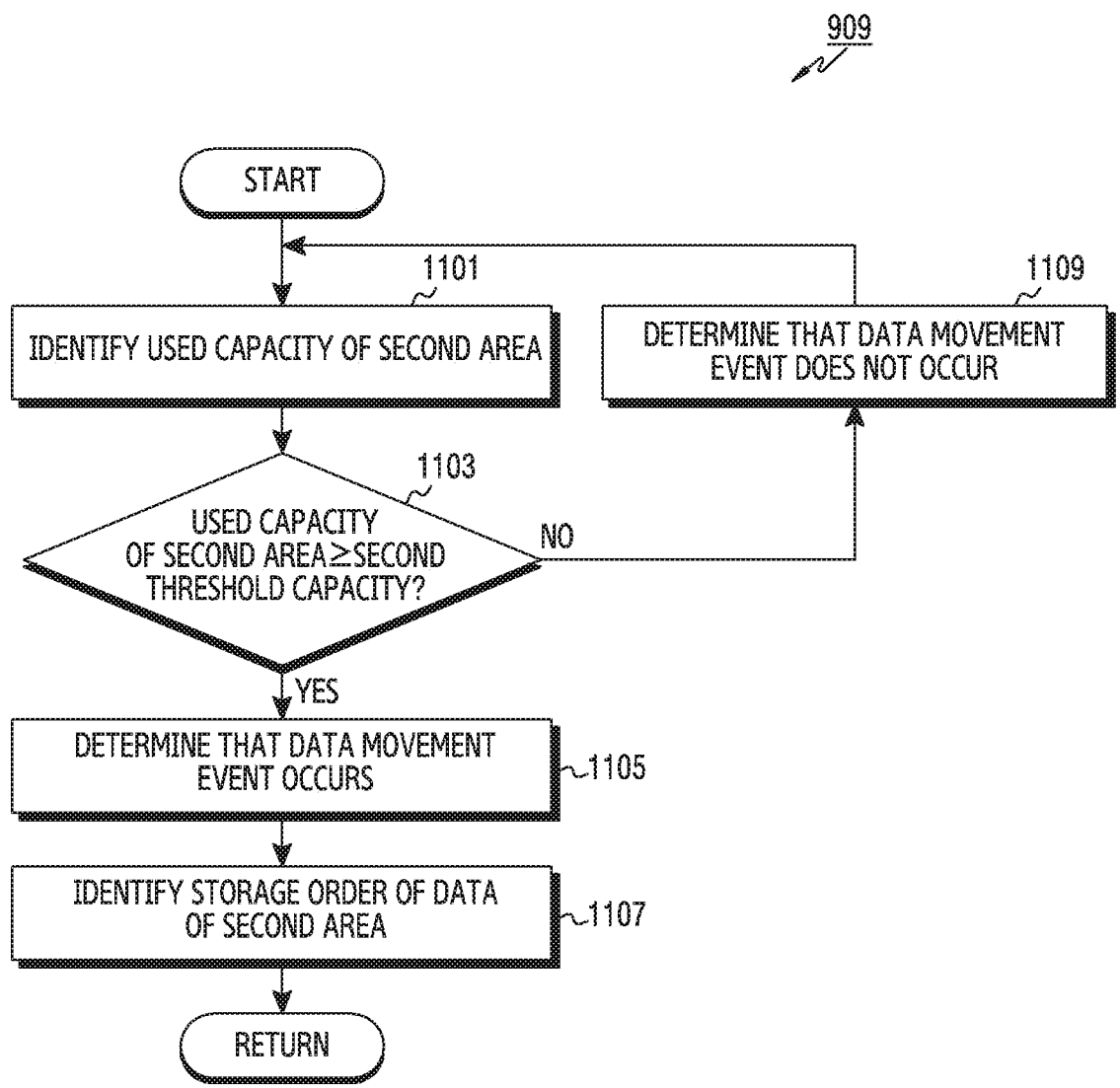
FIGS. 11A and 11B are flowcharts for detecting whether a secondary swap event occurs in the electronic device according to various embodiments of the present disclosure.

FIG. 11A is a flowchart for detecting whether a secondary swap event occurs in the electronic device according to various embodiments of the present disclosure. Hereinbelow, the operation of identifying the storage order of the data of the second area in operation 909 of FIG. 9 will be described. In the following embodiment, respective operations may be performed in sequence, but may not necessarily be performed in sequence. For example, the order of respective operations may be changed and at least two operations may be performed in parallel.

Referring to FIG. 11A, the electronic device may identify a used capacity of the second area in operation 1101. For example, the electronic device may identify a capacity of data stored in the second area of the volatile memory at least temporarily, and may determine the identified capacity as the used capacity of the second area. Alternatively, the electronic device may identify an area of the second area of the volatile memory in which data is stored, and may determine a capacity of the area in which the data is stored as the used capacity of the second area.

In operation 1103, the electronic device may determine whether the used capacity of the second area is larger than or equal to a second threshold capacity. For example, the electronic device may determine whether the used capacity of the second area of the volatile memory is larger than or equal to the second threshold capacity, by comparing the used capacity of the second area of the volatile memory and the second threshold capacity. The second threshold capacity may be a fixed value or a variable value.

When the used capacity of the second area is larger than or equal to the second threshold capacity, the electronic device may determine that a data movement event occurs in operation 1105. For example, when the used capacity of the second area of the volatile memory is larger than or equal to the second threshold capacity, the electronic device may determine that an available capacity of the second area is insufficient to move data of the first area, and may determine that the available capacity of the second area of the volatile memory should be additionally secured. To additionally secure the available capacity of the second area of the volatile memory, the electronic device may determine that an event for moving data from the second area to another area occurs.

In operation 1107, the electronic device may identify a storage order of data of the second area. For example, the electronic device may identify the storage order of the data stored in the second area to select at least one data to be moved from the second area of the volatile memory to the third area.

When the used capacity of the second area is smaller than the second threshold capacity, the electronic device may determine that the data movement event does not occur in operation 1109. For example, when the used capacity of the second area of the volatile memory is smaller than the second threshold capacity, the electronic device may determine that the available capacity of the second area is sufficient to move the data of the first area, and may determine that the event for moving data from the second area to another area does not occur.

Figure 11B:
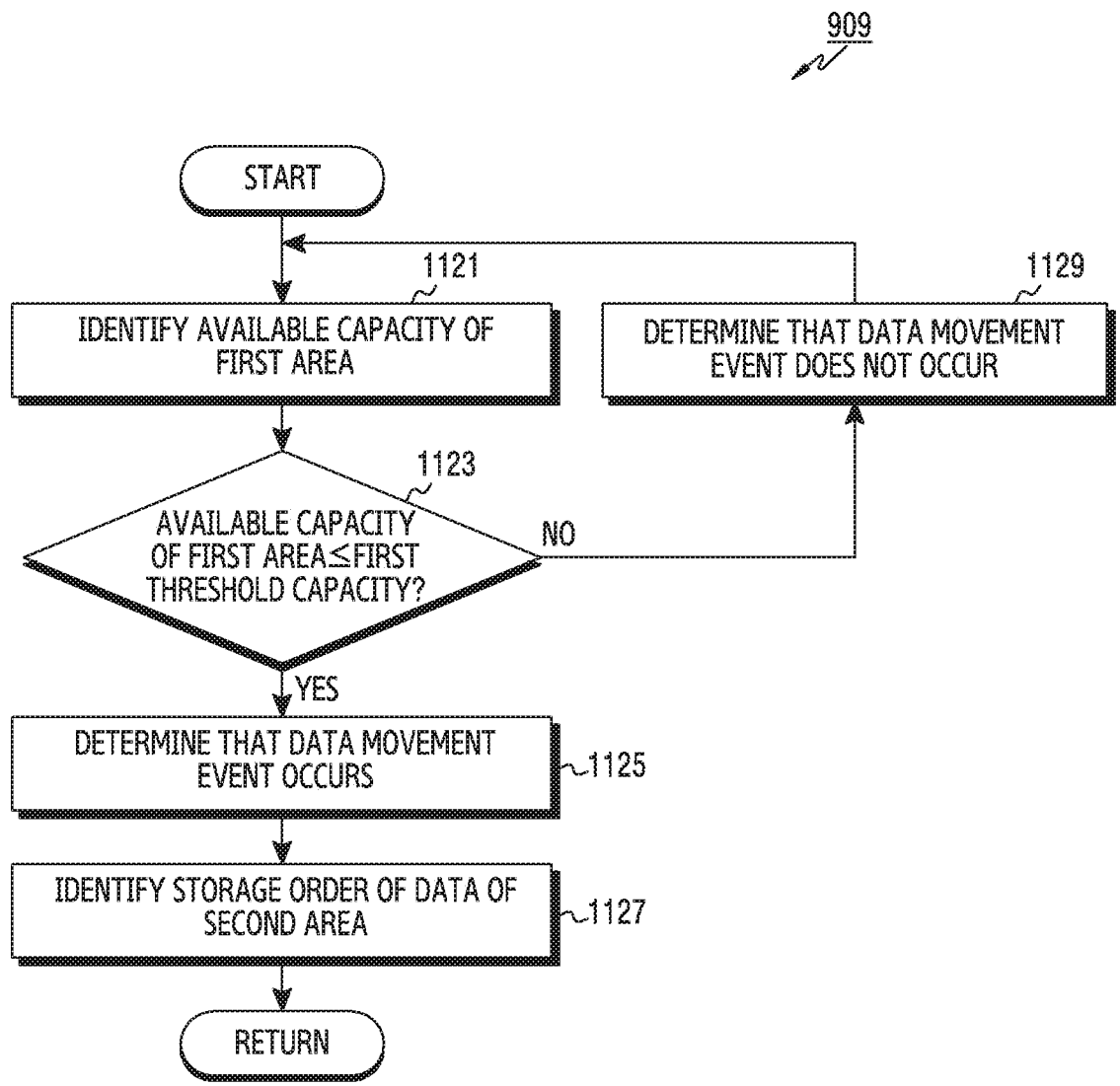

FIG. 11B is a flowchart for detecting whether a secondary swap event occurs in the electronic device according to various embodiments of the present disclosure. Hereinbelow, the operation of identifying the storage order of the data of the second area in operation 909 of FIG. 9 will be described. In the following embodiment, respective operations may be performed in sequence, but may not necessarily be performed in sequence. For example, the order of respective operations may be changed and at least two operations may be performed in parallel.

Referring to FIG. 11B, the electronic device may identify an available capacity of the first area in operation 1121. For example, the electronic device may identify a capacity of an area that does not store data in the first area of the volatile memory, for example, a usable capacity, and may determine the identified capacity as the available capacity of the first area.

In operation 1123, the electronic device may determine whether the available capacity of the first area is smaller than or equal to the first threshold capacity. For example, the electronic device may determine whether the usable capacity of the first area of the volatile memory is smaller than or equal to the first threshold capacity, by comparing the usable capacity of the first area of the volatile memory and the first threshold capacity. The first threshold capacity may be a fixed value or a variable value.

When the available capacity of the first area is smaller than or equal to the first threshold capacity, the electronic device may determine that a data movement event occurs in operation 1125. For example, when the available capacity of the first area is smaller than or equal to the first threshold capacity, the electronic device may predict that data will be moved from the first area of the volatile memory to the second area, and may determine that an available capacity of the second area of the volatile memory should be additionally secured. The electronic device may determine that an event for moving data from the second area to another area occurs in order to additionally secure the available capacity of the second area of the volatile memory.

In operation 1127, the electronic device may identify the storage order of data of the second area. For example, the electronic device may identify the storage order of the data stored in the second area to select at least one data to be moved from the second area of the volatile memory to the third area.

When the available capacity of the first area is larger than the first threshold capacity, the electronic device may determine that a data movement event does not occur in operation 1129. For example, when the available capacity of the first area is larger than the first threshold capacity, the electronic device may predict that data will not be moved from the first area of the volatile memory to the second area, and may determine that an event for moving data from the second area to another area will not occur.

Figure 12:
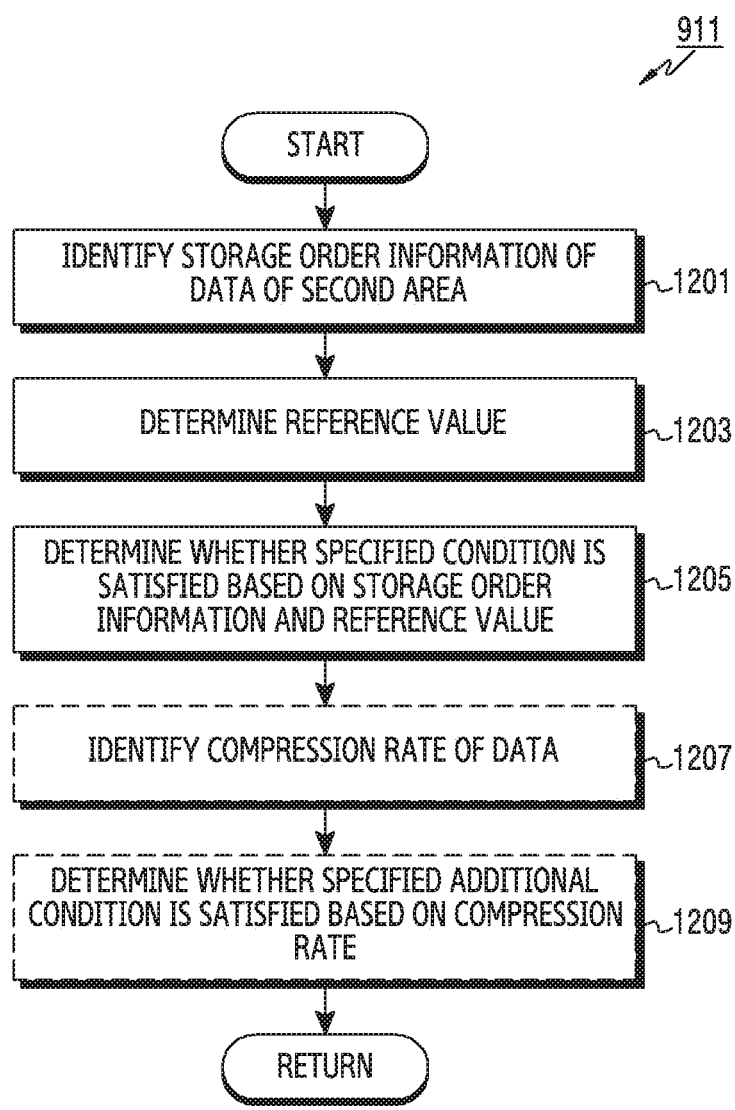
FIG. 12 is a flowchart for determining secondary swap data in the electronic device according to various embodiments of the present disclosure.

FIG. 12 is a flowchart for determining secondary swap data in the electronic device according to various embodiments of the present disclosure. Hereinbelow, the operation of determining whether the state of data, based on the identified storage order, satisfies a specified condition in operation 911 of FIG. 9 will be described. In the following embodiment, respective operations may be performed in sequence, but may not necessarily be performed in sequence. For example, the order of respective operations may be changed and at least two operations may be performed in parallel. In FIG. 12, operations illustrated by dashed blocks may be omitted according to an embodiment.

Referring to FIG. 12, the electronic device may identify storage order information of data stored in the second area in operation 1201. According to various embodiments, the storage order information may be serial numbers or time information. For example, when the object 1 OBJ1, the object 2 OBJ2, the object 3 OBJ3, the object 4 OBJ4, and the object N OBJN, which are compressed data, are stored in the second area as shown in FIG. 7, serial numbers 1, 10, 3, 11, 2 may be assigned to the respective objects.

In operation 1203, the electronic device may determine a reference value for selecting data stored in the second area. According to an embodiment, the electronic device may determine a reference value based on the serial numbers of the data stored in the second area. For example, the electronic device may calculate a sum of the serial numbers of the data stored in the second area, and then may determine a reference value based on the calculated sum and the number of data stored in the second area. For example, when the five objects are stored in the second area and the sum of the serial numbers assigned to the respective objects is 27 as shown in FIG. 7, the reference value may be determined to be 2.7 by using Equation 1. The method of calculating the reference value is merely an example, and is not limited. According to another embodiment, the electronic device may determine a reference time based on the time information of the data stored in the second area, and may determine the reference time as a reference value. For example, the electronic device may consider the time information of the data stored in the second area, and may determine an average time of the data stored in the second area, and may determine a reference time based on the average time. According to another embodiment, the electronic device may determine the number of data as a reference value. For example, the electronic device may determine a reference value indicating the number of data to be moved to the third area, based on the used capacity of the second area. Alternatively, the electronic device may determine the reference value indicating the number of data to be moved to the third area, based on the available capacity of the second area. According to an embodiment, the number of data to be moved to the third area may be a pre-specified value.

In operation 1205, the electronic device may determine whether the data stored in the second area satisfies the specified condition, based on the storage order information and the reference value. According to an embodiment, the electronic device may examine whether a serial number of each of the data stored in the second area is smaller than the reference value, and may determine data having a serial number smaller than the reference value as data satisfying the specified condition. For example, the object 1 and the object N having serial numbers smaller than the reference value 2.7 may be determined as satisfying the specified condition as shown in FIG. 7. According to an embodiment, the electronic device may determine whether data satisfies the specified condition, based on the serial numbers of the data stored in the second area, and the reference value indicating the number of data. For example, the electronic device may determine that a first threshold number of data having small serial numbers from among the compressed data stored in the second area satisfy the specified condition. For example, when the object 1, the object 2, the object 3, the object 4, and the object N, which are compressed data stored in the second area, have serial numbers 1, 10, 3, 11, 2, and the first threshold number is 2, the electronic device may determine that the object 1 having the serial number 1, and the object N having the serial number 2 satisfy the specified condition. According to an embodiment, the electronic device may examine whether corresponding data was stored earlier than the reference time determined as the reference value, by using the time information of the respective data stored in the second area, and may determine data stored earlier than the reference time as data satisfying the specified condition. According to an embodiment, the electronic device may determine as many data as the reference value from among the data stored in the second area first, as satisfying the specified condition. For example, when time information of the object 1, the object 2, the object 3, the object 4, and the object N, which are compressed data stored in the second area, 12:04:02, 18:35:27, 07:02:34, 03:05:50, 13:11:00, and the number specified as the reference value is 2, the electronic device may determine that the object 4 stored first from among the five objects, and the object 3 stored next satisfy the specified condition. In operation 1207, the electronic device may identify a compression rate of the data satisfying the specified condition. For example, the electronic device may identify the compression rate by using a compressed size of the data satisfying the specified condition and an original size. When compressing corresponding data to move and store in the second area as in operation 903, the electronic device may calculate a compression rate of the corresponding data and may store information on the calculated compression rate.

In operation 1209, the electronic device may determine whether a specified additional condition is satisfied based on the identified compression rate. According to various embodiments, the additional condition may include a condition regarding the compression rate. For example, the electronic device may compare a compression rate of the data satisfying the specified condition in operation 1205, and a threshold compression rate. When the compression rate of the data is higher than or equal to the threshold compression rate, the electronic device may determine that the specified additional condition is satisfied, and, when the compression rate of the selected data is lower than the threshold compression rate, may determine that the specified additional condition is not satisfied.

Figure 13:
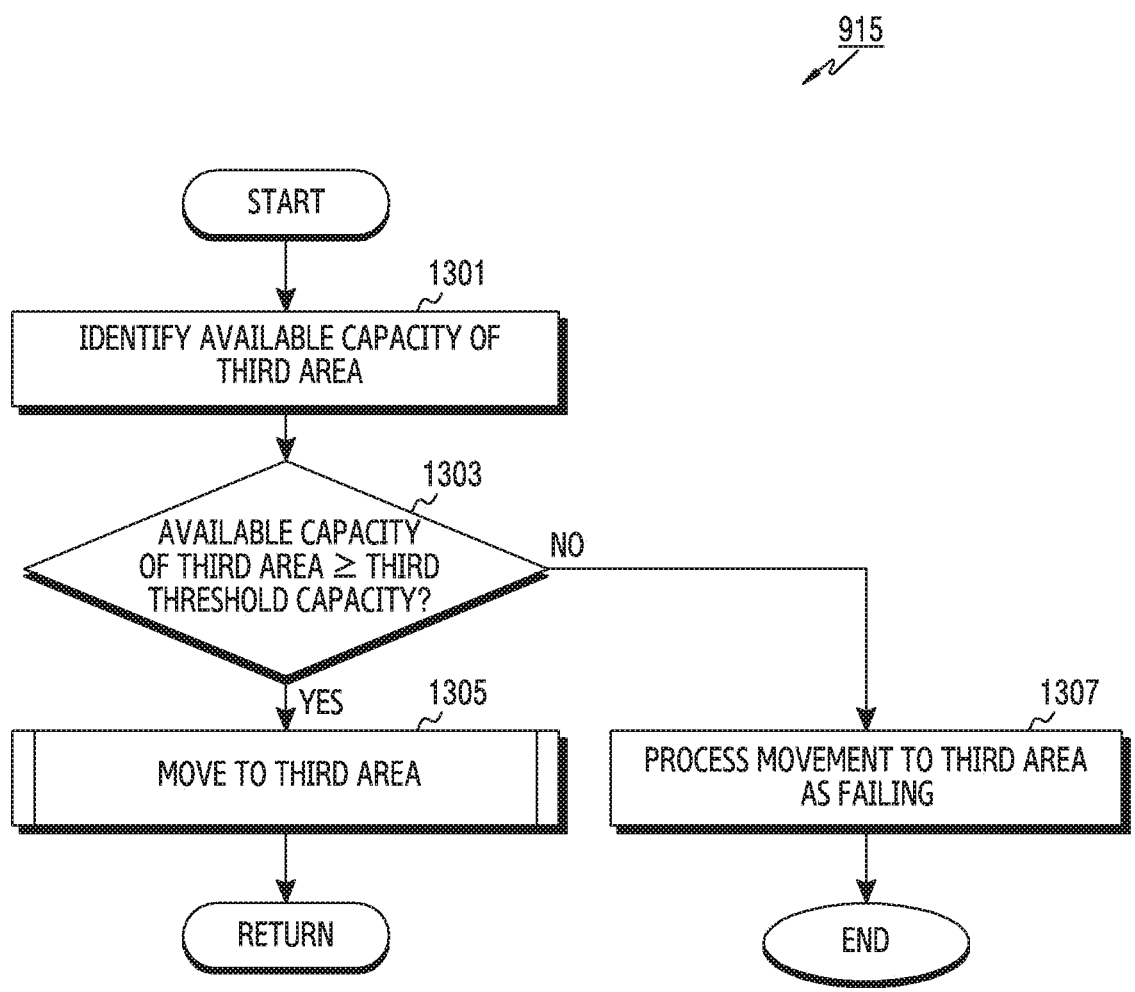
FIG. 13 is a flowchart for performing a secondary swap based on an available capacity of a secondary swap area in the electronic device according to various embodiments of the present disclosure.

FIG. 13 is a flowchart for performing a secondary swap based on an available capacity of a secondary swap area in the electronic device according to various embodiments of the present disclosure. Hereinbelow, the operation of moving data satisfying a specified condition to the third area in operation 915 of FIG. 9 will be described. In the following embodiment, respective operations may be performed in sequence, but may not necessarily be performed in sequence. For example, the order of respective operations may be changed and at least two operations may be performed in parallel.

Referring to FIG. 13, the electronic device may identify an available capacity of the third area in operation 1301. For example, the electronic device may identify a usable capacity in the third area of the nonvolatile memory. Alternatively, the electronic device may identify a capacity of an area that does not store data in the third area of the nonvolatile memory.

In operation 1303, the electronic device may determine whether the available capacity of the third area is larger than or equal to a third threshold capacity. For example, the electronic device may determine whether the usable capacity of the third area of the nonvolatile memory is larger than or equal to the third threshold capacity, by comparing the available capacity of the third area of the nonvolatile memory and the third threshold capacity. The third threshold capacity may be fixed or variable.

When the available capacity of the third area is larger than or equal to the third threshold capacity, the electronic device may move at least one data satisfying a specified condition from among the data stored in the second area to the third area in operation 1305. For example, when the available capacity of the third area of the nonvolatile memory is larger than or equal to the third threshold capacity, the electronic device may determine that it is possible to move data to the third area, and may move data satisfying the specified condition to the third area of the nonvolatile memory. The electronic device may decompress the data satisfying the specified condition, and then may move the decompressed data to the third area and may store the same therein.

When the available capacity of the third area is smaller than the third threshold capacity, the electronic device may process movement to the third area as failing in operation 1307. For example, when the available capacity of the third area of the nonvolatile memory is smaller than the third threshold capacity, the electronic device may determine that it is impossible to move data to the third area, and may not move the data satisfying the specified condition to the third area and may process movement as failing.

Figure 14:
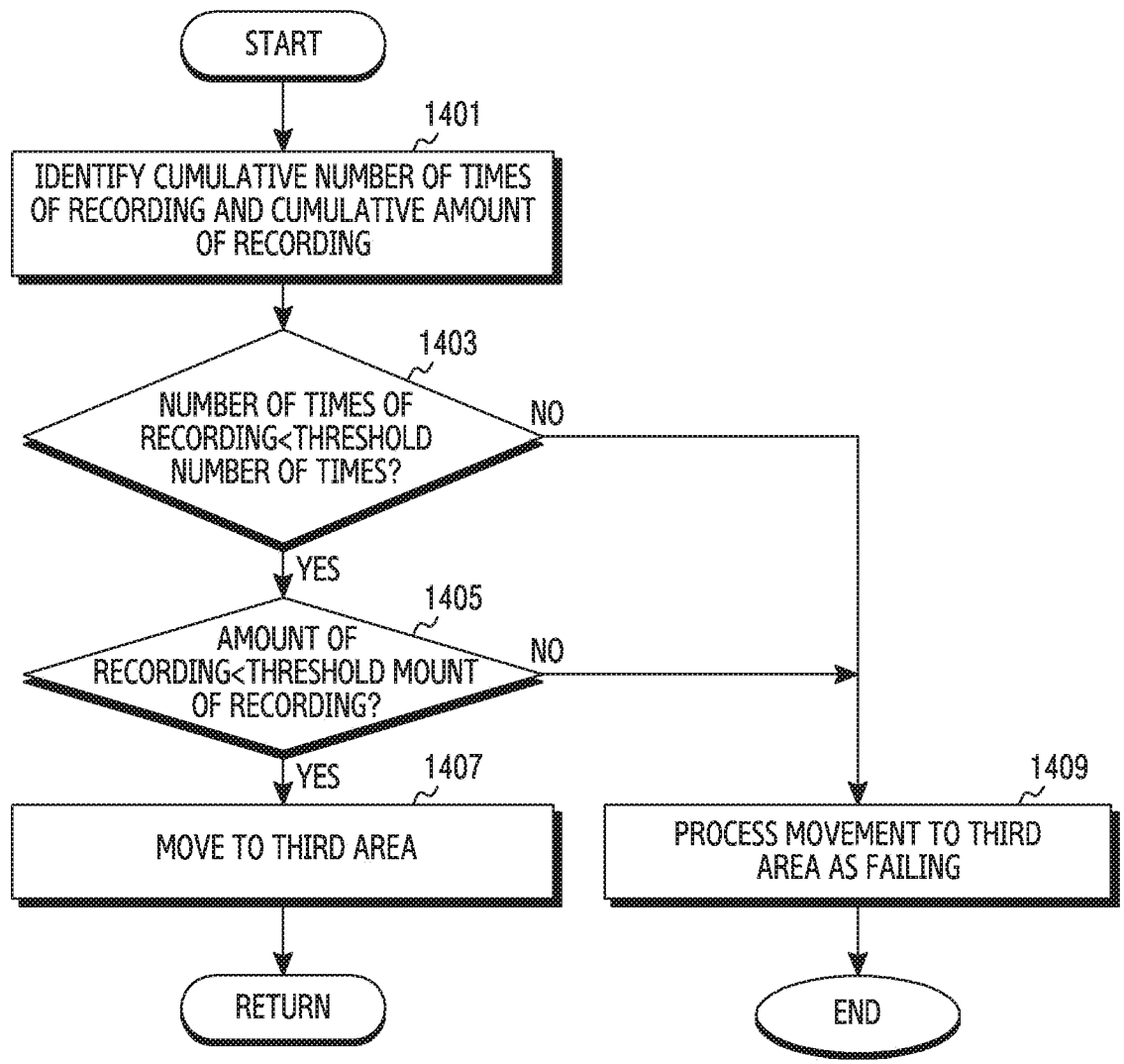
FIG. 14 is a flowchart for performing a secondary swap based on a state of a secondary swap area in the electronic device according to various embodiments of the present disclosure.

FIG. 14 is a flowchart for performing a secondary swap based on a state of a secondary swap area in the electronic device according to various embodiments of the present disclosure. Hereinbelow, the operation of moving data satisfying a specified condition to the third area in operation 915 of FIG. 9 will be described. In the following embodiment, respective operations may be performed in sequence, but may not necessarily be performed in sequence. For example, the order of respective operations may be changed and at least two operations may be performed in parallel Referring to FIG. 14, the electronic device may identify the cumulative number of times of recording on the nonvolatile memory, and a cumulative amount of recording on the nonvolatile memory in operation 1401. For example, the electronic device may identify the total number of times of writing on the nonvolatile memory, and the total cumulative amount of recording on the nonvolatile memory. In another example, the electronic device may identify the total number of times of writing on the nonvolatile memory for a predetermined time, and the total cumulative amount of recording on the nonvolatile memory for a predetermined time. In still another example, the electronic device may identify the total number of times of writing on the third area of the nonvolatile memory, and the total cumulative amount of recording on the third area of the nonvolatile memory. In another example, the electronic device may identify the total number of times of writing on the third area of the nonvolatile memory for a predetermined time, and the total cumulative amount of recording on the third area of the nonvolatile memory for a predetermined time. The total cumulative amount of recording on the nonvolatile memory or the total cumulative amount of recording on the third area of the nonvolatile memory may be calculated by accumulating the capacity of corresponding data every time the data is recorded on the nonvolatile memory or the third area of the nonvolatile memory.

The electronic device may determine whether the cumulative number of times of recording is smaller than a threshold number of times in operation 1403. For example, the electronic device may determine whether at least one of the total number of times of writing on the nonvolatile memory, the total number of times of writing on the nonvolatile memory for a predetermined time, the total number of times of writing on the third area of the nonvolatile memory, or the total number of times of writing on the third area of the nonvolatile memory for a predetermined time is smaller than the threshold number of times. The threshold number of times may be determined according to a predetermined number of times of writing allowed on the nonvolatile memory or the third area of the nonvolatile memory.

When the cumulative number of times of recording on the third area is smaller than the threshold number of times, the electronic device may determine whether the cumulative amount of recording on the third area is smaller than a threshold amount of recording in operation 1405. For example, the electronic device may determine whether at least one of the total cumulative amount of recording on the nonvolatile memory, the total cumulative amount of recording on the nonvolatile memory for a predetermined time, the total cumulative amount of recording on the third area of the nonvolatile memory, or the total cumulative amount of recording on the third area of the nonvolatile memory for a predetermined time is smaller than the threshold amount of recording. The threshold amount of recording may be determined by a predetermined amount of recording allowed on the nonvolatile memory or the third area of the nonvolatile memory.

When the cumulative amount of recording on the third area is smaller than the threshold amount of recording, the electronic device may move at least one data satisfying the specified condition from among the data stored in the second area to the third area in operation 1407. For example, when the cumulative number of times of recording is smaller than the threshold number of times and the cumulative amount of recording is smaller than the threshold amount of recording, the electronic device may determine that a number of times of recording and an amount of recording allowed on the nonvolatile memory or the third area of the nonvolatile memory remain, and may move at least one data satisfying the specified condition from among the data stored in the second area to the third area.

When the cumulative number of times of recording on the third area is larger than or equal to the threshold number of times, the electronic device may process movement to the third area as failing in operation 1409. Alternatively, when the cumulative amount of recording on the third area is larger than or equal to the threshold amount of recording, the electronic device may process movement to the third area as failing in operation 1409. For example, when the cumulative number of times of recording on the third area is larger than or equal to the threshold number of times, and/or when the cumulative amount of recording on the third area of the nonvolatile memory is larger than or equal to the threshold amount of recording, the electronic device may determine that a number of times of recording and/or an amount of recording allowed on the nonvolatile memory or the third area of the nonvolatile memory does not remain due to the lifetime of the nonvolatile memory or the third area of the nonvolatile memory. Accordingly, the electronic device may determine that it is impossible to move data to the third area, and may not move data satisfying the specified condition to the third area and may process movement as failing.

In FIG. 14, when the cumulative number of times of recording on the nonvolatile memory is smaller than the threshold number of times, and the cumulative amount of recording on the nonvolatile memory is smaller than the threshold amount of recording, data satisfying the specified condition is moved to the third area, and in other cases, movement to the third area is processed as failing. However, according to various embodiments, even when any one of the cumulative number of times of recording on the nonvolatile memory and the cumulative amount of recording satisfies a threshold value (for example, the threshold number of times, the threshold amount of recording), the electronic device may move data satisfying the specified condition to the third area. For example, when the cumulative number of times of recording on the nonvolatile memory is smaller than the threshold number of times, the electronic device may move data satisfying the specified condition to the third area. Alternatively, when the cumulative amount of recording on the nonvolatile memory is smaller than the threshold amount of recording, the electronic device may move data satisfying the specified condition to the third area.

Figure 15A:
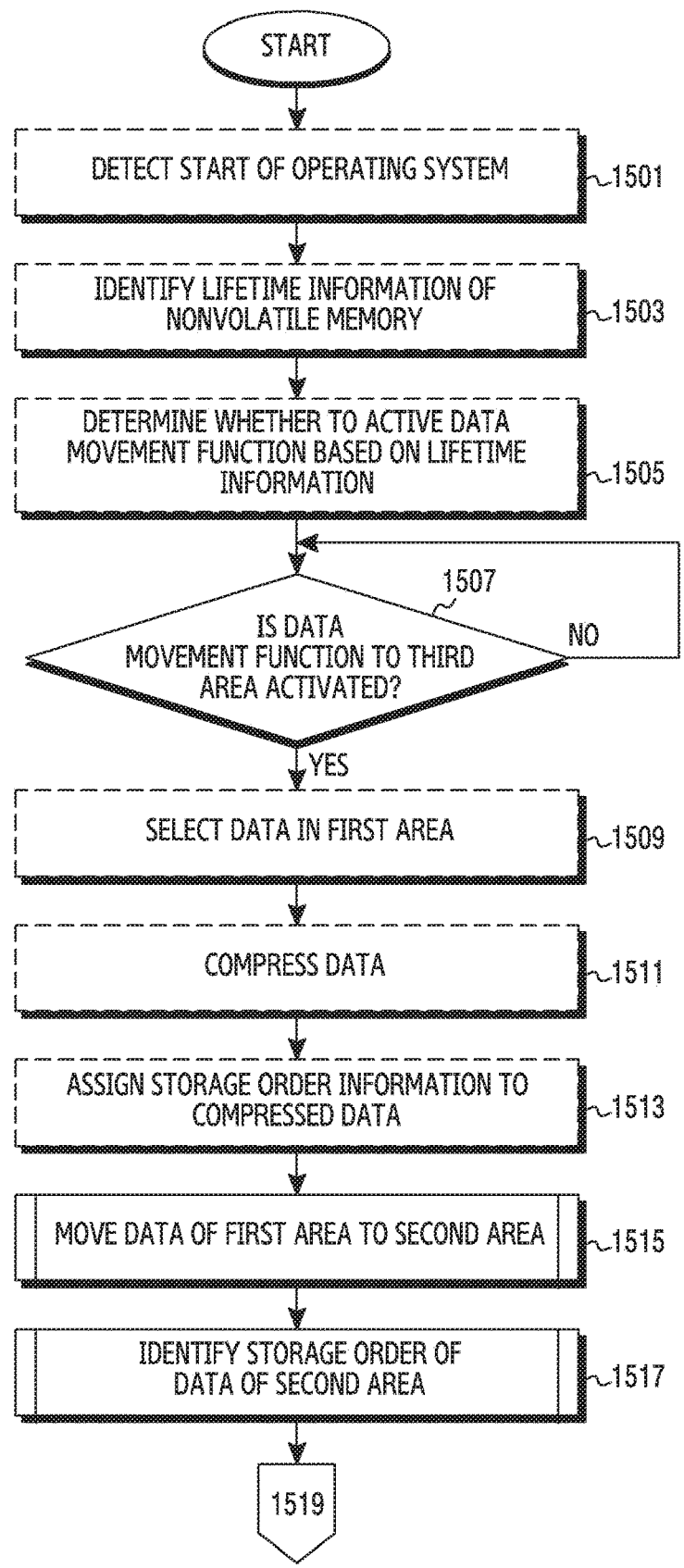
FIGS. 15A and 15B are flowcharts for controlling an active state of a secondary swap function in the electronic device according to various embodiments of the present disclosure.
Figure 15B:
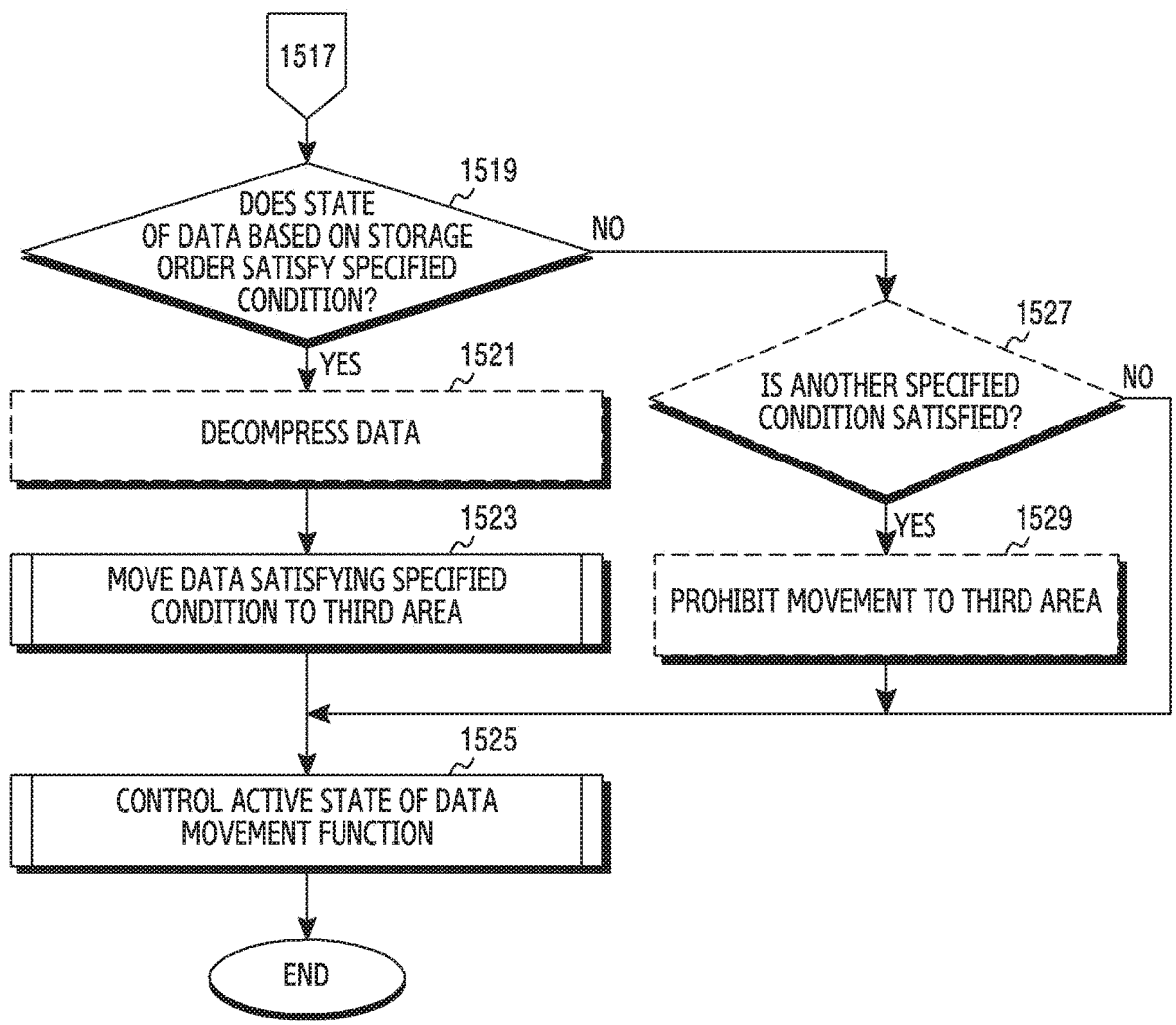

FIGS. 15A and 15B are flowcharts for controlling an active state of a secondary swap function in the electronic device according to various embodiments of the present disclosure. In the following embodiments, respective operations may be performed in sequence, but may not necessarily be performed in sequence. For example, the order of respective operations may be changed and at least two operations may be performed in parallel. FIGS. 15A and 15B omit operations illustrated by dashed lines according to an embodiment. Referring to FIGS. 15A and 15B, the electronic device may detect that the operating system starts in operation 1501. For example, the electronic device may detect that the operating system starts when power of the electronic device changes from an off state to an on state.

In operation 1503, the electronic device may identify lifetime information of the nonvolatile memory. For example, the electronic device may identify, as the lifetime information of the nonvolatile memory, at least one of a cumulative amount of recording on the nonvolatile memory, the cumulative number of times of recording on the nonvolatile memory, a cumulative amount of recording on the third area of the nonvolatile memory, the cumulative number of times of recording on the third area of the nonvolatile memory, or a combination thereof.

In operation 1505, the electronic device may determine whether to activate a data movement function based on the lifetime information of the nonvolatile memory. For example, the electronic device may examine whether the lifetime information of the nonvolatile memory satisfies a predetermined lifetime condition. When the lifetime information of the nonvolatile memory satisfies the predetermined lifetime condition, the electronic device may activate the data movement function. Alternatively, when the lifetime information of the nonvolatile memory does not satisfy the predetermined lifetime condition, the electronic device may inactivate the data movement function. For example, when the cumulative amount of recording on the nonvolatile memory is smaller than a predetermined threshold amount of recording, the electronic device may activate the data movement function, and, when the cumulative amount of recording on the nonvolatile memory is larger than or equal to the predetermined threshold amount of recording, the electronic device may inactivate the data movement function. When the cumulative number of times of recording on the nonvolatile memory is smaller than a predetermined threshold number of times of recording, the electronic device may activate the data movement function, and, when the cumulative number of times of recording on the nonvolatile memory is larger than or equal to the predetermined threshold number of times of recording, the electronic device may inactivate the data movement function. When the cumulative amount of recording on the third area of the nonvolatile memory is smaller than a predetermined threshold amount of recording, the electronic device may activate the data movement function, and, when the cumulative amount of recording on the third area of the nonvolatile memory is larger than or equal to the predetermined threshold amount of recording, the electronic device may inactivate the data movement function. When the cumulative number of times of recording on the third area of the nonvolatile memory is smaller than a predetermined threshold number of times of recording, the electronic device may activate the data movement function, and, when the cumulative number of times of recording on the third area of the nonvolatile memory is larger than or equal to the predetermined threshold number of times of recording, the electronic device may inactivate the data movement function. According to an embodiment, the cumulative amount of recording or the cumulative number of times of recording may be an amount of recording or a number of times of recording accumulated from the time when the electronic device is used until the present time. According to an embodiment, the cumulative amount of recording or the cumulative number of times of recording may be an amount of recording accumulated for a predetermined time section or a number of times of recording accumulated for a predetermined time section. For example, the predetermined time section may be a time section such as one day, one week, or one month. The cumulative amount of recording or the cumulative number of times of recording for the predetermined time section may be initialized when the predetermined time section passes.

According to an embodiment, when the data movement function is inactivated according to the lifetime information of the nonvolatile memory, the nonvolatile memory may be changed, or, when the predetermined time section passes, the data movement function may be activated again.

In operation 1507, the electronic device may determine whether the data movement function to the third area is activated or not. For example, the electronic device may determine whether the function of moving data from the second area of the volatile memory to the third area of the nonvolatile memory is activated or inactivated by the lifetime of the nonvolatile memory or the third area of the nonvolatile memory.

When the data movement function to the third area is activated, the electronic device may select data stored in the first area in operation 1509. For example, the electronic device may select data of at least one page that has not been used for the longest time from among page data of the first area. According to an embodiment, the electronic device may select data in the unit of multiples of page, data in the unit of processor, or data in other units, rather than data in the unit of page.

The electronic device may compress the selected data in operation 1511. For example, the electronic device may compress the data of the page by using a well-known algorithm such as an LZO algorithm or an LZ4 algorithm In operation 1513, the electronic device may assign storage order information to the compressed data. For example, the electronic device may identify serial numbers or time information on the compressed data. The serial numbers or time information may indicate an order in which the compressed data of the electronic device is stored in the second area. For example, when the maximum value of the serial numbers assigned to the data stored in the second area at least temporarily until the present time is 20, the electronic device may assign serial number 21 to the compressed data. Alternatively, the electronic device may assign time information indicating a time at which the compressed data is stored in the second area.

In operation 1515, the electronic device may move the data selected in the first area to the second area. For example, the electronic device may move the data selected from data stored in the first area of the volatile memory to the second area of the volatile memory, and may store the same therein as in operation 907 of FIG. 9.

In operation 1517, the electronic device may identify a storage order of data of the second area. For example, the electronic device may identify the storage order of the data of the second area as in operation 909 of FIG. 9.

In operation 1519, the electronic device may determine whether states of data based on the identified storage order satisfies a specified condition. For example, the electronic device may determine whether the state of each data satisfies a specified condition, based on the storage order of the data stored in the second specified area as in operation 911 of FIG. 9.

When the states of the data based on the identified storage order satisfy the specified condition, the electronic device may decompress the data satisfying the specified condition in operation 1521. For example, the electronic device may decompress first data and second data satisfying the specified condition from among the data stored in the second area.

In operation 1523, the electronic device may move the data satisfying the specified condition to the third area. For example, as in operation 915 of FIG. 9, the electronic device may move at least one data satisfying the specified condition from among the data stored in the second area to the third area of the nonvolatile memory. The first data and the second data moved to the third specified area may be data decompressed in operation 913.

When the states of the data based on the storage order do not satisfy the specified condition, the electronic device may determine whether the states of the data stored in the second area satisfy another specified condition in operation 1527. For example, as in operation 917 of FIG. 9, the electronic device may determine whether the states of the data stored in the second area satisfy another specified condition based on the storage order of the data stored in the second area.

In operation 1529, the electronic device may prohibit at least one data satisfying another specified condition from being moved to the third area. For example, the electronic device may prohibit data that is stored in the second area for a short time from among the data stored in the second area, or data that is expected to be stored in the second area only for a short time, from being moved to the third area of the nonvolatile memory at least temporarily.

The electronic device may control an active state of a data movement function in operation 1523. For example, the electronic device may try to move data of the second area to the third area, and then may activate or inactivate the data movement function, based on lifetime information on the nonvolatile memory or the third area of the nonvolatile memory, or the number of failures of data movement to the third area.

Figure 16:
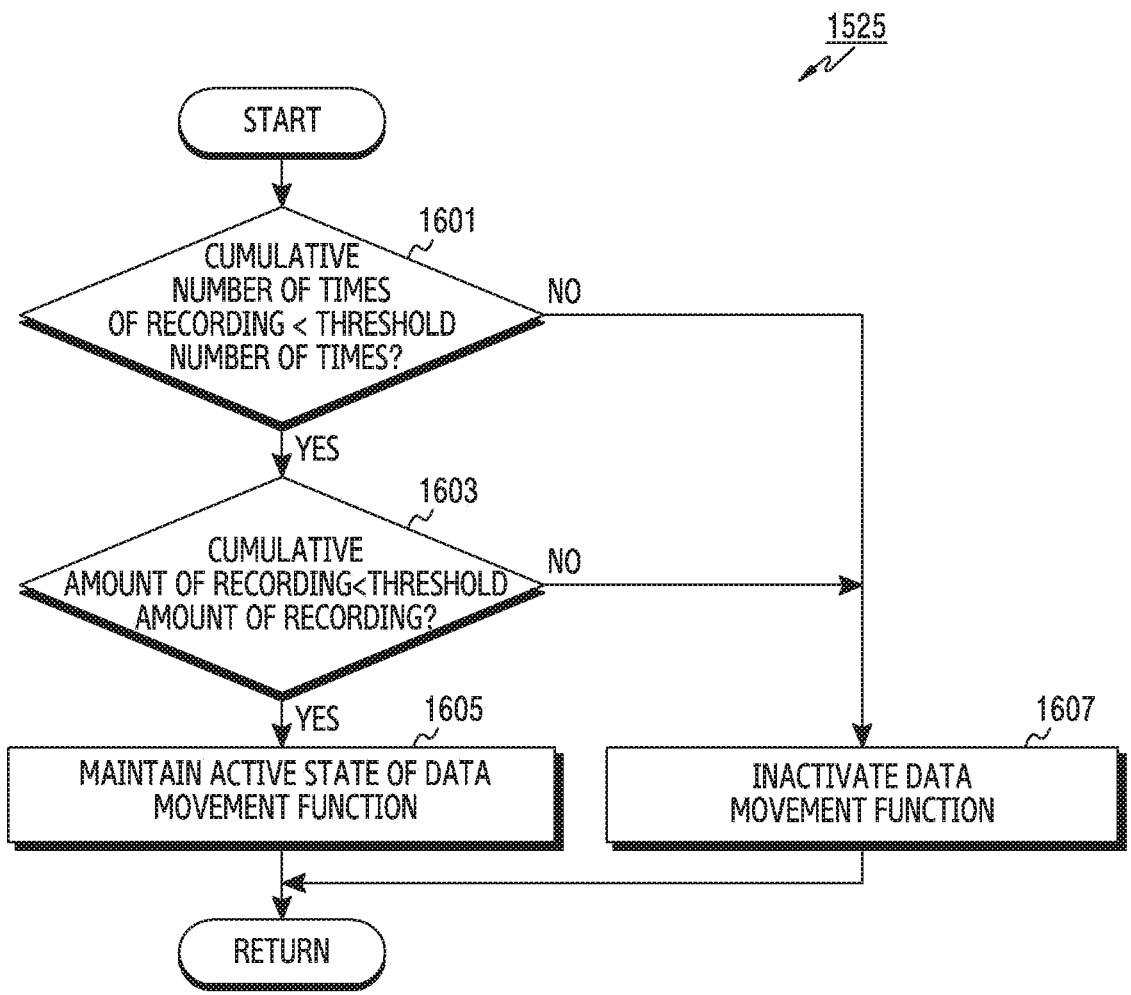
FIG. 16 is a flowchart for controlling an active state of a secondary swap function based on a state of a secondary swap area in the electronic device according to various embodiments of the present disclosure.

FIG. 16 is a flowchart for controlling an active state of a secondary swap function based on a state of a secondary swap area in the electronic device according to various embodiments of the present disclosure. Hereinafter, the operation of controlling the active state of the data movement function in operation 1525 of FIG. 15 will be described. In the following embodiment, respective operations may be performed in sequence, but may not necessarily be performed in sequence. For example, the order of respective operations may be changed, and at least two operations may be performed in parallel.

Referring to FIG. 16, the electronic device may determine whether the cumulative number of times of recording on the nonvolatile memory is smaller than a threshold number of times in operation 1601. For example, the electronic device may try to move data from the second area to the third area, and then may determine whether the cumulative number of times of recording on the nonvolatile memory or the third area of the nonvolatile memory is smaller than the threshold number of times. According to an embodiment, the electronic device may succeed in moving data from the second area to the third area as in operation 1523 of FIG. 15, and then may increase the cumulative number of times of recording on the nonvolatile memory or the third area of the nonvolatile memory by 1, and may determine whether the increased cumulative number of times of recording is smaller than the threshold number of times. According to an embodiment, when the data movement fails due to the available capacity or lifetime of the third area as in operation 1525 of FIG. 15, the electronic device may maintain the cumulative number of times of recording on the nonvolatile memory or the third area of the nonvolatile memory, and may determine whether the maintained cumulative number of times of recording is smaller than the threshold number of times. According to an embodiment, when the data of the second area does not satisfy the pre-specified condition and data movement to the third area fails as in operation 1519 of FIG. 15, the electronic device may maintain the number of times of recording on the nonvolatile memory or the third area of the nonvolatile memory, and may determine whether the maintained number of times of recording is smaller than the threshold number of times.

When the cumulative number of times of recording on the nonvolatile memory is smaller than the threshold number of times, the electronic device may determine whether the cumulative amount of recording on the nonvolatile memory is smaller than a threshold amount of recording in operation 1603. For example, the electronic device may try to move data from the second area to the third area, and then may determine whether the total cumulative amount of recording on the nonvolatile memory or the third area of the nonvolatile memory is smaller than the threshold amount of recording. According to an embodiment, the electronic device may succeed in moving the data from the second area to the third area as in operation 1523 of FIG. 15, and then may calculate the cumulative amount of recording on the nonvolatile memory or the third area of the nonvolatile memory, and may determine whether the calculated cumulative amount of recording is smaller than the threshold amount of recording. According to an embodiment, when data movement fails based on the available capacity or lifetime information of the third area in operation 1523 of FIG. 15, the electronic device may maintain the cumulative amount of recording on the nonvolatile memory or the third area of the nonvolatile memory, and may determine whether the maintained cumulative amount of recording is smaller than the threshold amount of recording. According to an embodiment, when data of the second area does not satisfy the pre-specified condition and data movement to the third area fails as in operation 1519 of FIG. 15, the electronic device may maintain the cumulative amount of recording on the nonvolatile memory or the third area of the nonvolatile memory, and may determine whether the maintained cumulative amount of recording is smaller than the threshold amount of recording.

When the cumulative amount of recording of the nonvolatile memory is smaller than the threshold amount of recording, the electronic device may maintain the active state of the data movement function in operation 1605. For example, when the cumulative number of times of recording is smaller than the threshold number of times and the cumulative amount of recording is smaller than the threshold amount of recording, the electronic device may determine that a number of times of recording and an amount of recording allowed on the nonvolatile memory or the third area of the nonvolatile memory remain, and may maintain the function of moving data from the second area to the third area in the active state.

When the cumulative amount of recording on the nonvolatile memory is larger than or equal to the threshold amount of recording, or the cumulative number of times of recording on the nonvolatile memory is larger than or equal to the threshold number of times of recording, the electronic device may inactivate the data movement function in operation 1607. For example, when the cumulative number of times of recording is larger than or equal to the threshold number of times, or the cumulative amount of recording is larger than or equal to the threshold amount of recording, the electronic device may determine that a number of times of recording and an amount of recording allowed on the nonvolatile memory or the third area of the nonvolatile memory do not remain, and may change the function of moving data from the second area to the third area to the inactive state.

Figure 17:
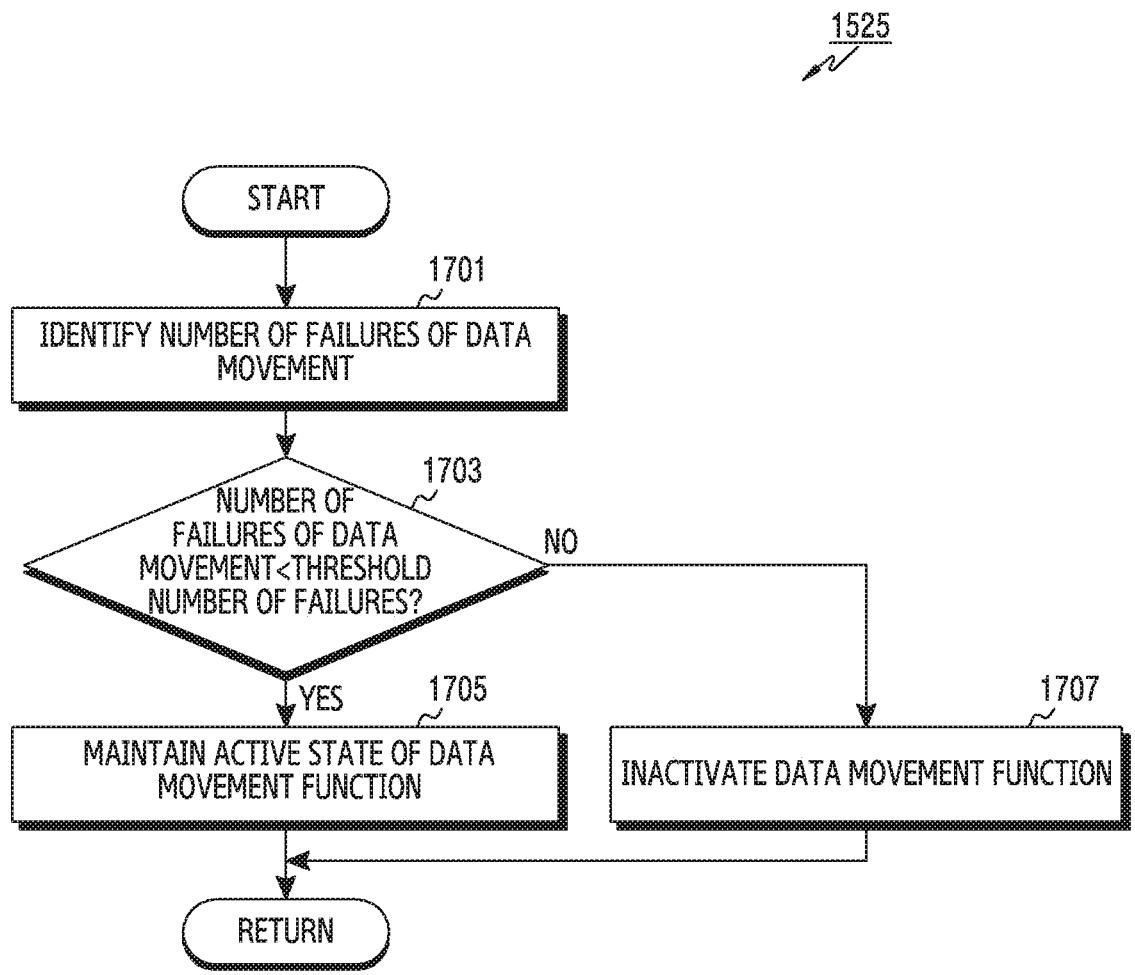
FIG. 17 is a flowchart for controlling an active state of a secondary swap function based on the number of failures of a secondary swap in the electronic device according to various embodiments of the present disclosure.

FIG. 17 is a flowchart for controlling an active state of a secondary swap function based on the number of failures of the secondary swap in the electronic device according to various embodiments of the present disclosure. Hereinafter, the operation of controlling the active state of the data movement function in operation 1525 of FIG. 15 will be described. In the following embodiment, respective operations may be performed in sequence, but may not necessarily be performed in sequence. For example, the order of respective operations may be changed, and at least two operations may be performed in parallel.

Referring to FIG. 17, the electronic device may identify the number of failures of data movement in operation 1701. For example, when data of the second area does not satisfy the pre-specified condition and data movement to the third area fails as in operation 1519 of FIG. 15, or every time data movement fails due to the available capacity or lifetime information of the third area in operation 1523 of FIG. 15, the electronic device may increase the number of failures of data movement and may identify the number of failures of data movement. The number of failures of data movement may be initialized every time a predetermined time section passes.

The electronic device may determine whether the number of failures of data movement is smaller than a threshold number of failures in operation 1703. For example, the electronic device may compare the number of failures of data movement and the threshold number of failures, and may determine whether the number of failures of data movement is smaller than the threshold number of failures.

When the number of failures of data movement is smaller than the threshold number of failures, the electronic device may maintain the active state of the data movement function in operation 1705. For example, when the number of failures of data movement is smaller than the threshold number of failures, the electronic device may maintain the data movement function in the active state in order to continuously try to move data from the second area to the third area.

When the number of failures of data movement is larger than or equal to the threshold number of failures, the electronic device may inactivate the data movement function in operation 1707. For example, when the number of failures of data movement is larger than or equal to the threshold number of failures, the electronic device may change the data movement function to the inactive state in order to prevent the try to move data from the second area to the third area. According to an embodiment, the data movement function which is inactivated according to the number of failures of movement may be changed to the active state after a predetermined time section passes.

According to various embodiments of the present disclosure as described above, an operating method of an electronic device may include: storing first data and second data which are stored in a first specified area of a volatile memory in a second specified area of the volatile memory; identifying an order in which the first data and the second data are stored in the second specified area; and, when states of the first data and the second data satisfy a specified condition based on the order, moving at least one of the first data and the second data from the second specified area of the volatile memory to a third specified area of a nonvolatile memory.

According to various embodiments, the specified condition may include a time at which data is stored in the second specified area, an estimated time at which data is to be stored in the second specified area, a frequency of use of data, a last using time of data, or a combination thereof.

According to various embodiments, the operating method of the electronic device may further include, when states of the first data and the second data satisfy another specified condition, prohibiting the first data and the second data from being moved from the second specified area of the volatile memory to the third specified area of the nonvolatile memory at least temporarily.

According to various embodiments, another specified condition may include a time at which data is stored in the second specified area, an estimate time at which data is to be stored in the second specified area, a frequency of use of data, a last using time of data, or a combination thereof.

According to various embodiments, the operating method of the electronic device may include identifying at least one of capacities and compression rates of the first data and the second data; and determining states of the first data and the second data further based on at least one of the capacity and the compression rate.

According to various embodiments, determining whether the states of the first data and the second data satisfy the specified condition may include: identifying a time at which the first data and the second data are stored in the volatile memory; and determining states of the first data and the second data further based on the time at which the data is stored.

According to various embodiments, storing the first data and the second data stored in the first specified area of the volatile memory in the second specified area of the volatile memory may include compressing the first data and the second data, and moving the data to the third specified area of the nonvolatile memory may include decompressing at least one of the first data and the second data which are compressed.

According to various embodiments, the first specified area may include an area which stores uncompressed data at least temporarily, and the second specified area may include an area which stores compressed data at least temporarily.

According to various embodiments, storing the first data and the second data stored in the first specified area of the volatile memory in the second specified area of the volatile memory may include: determining whether a usable capacity of the first specified area of the volatile memory belongs to a specified capacity of the memory; and, when the usable capacity belongs to the specified capacity, moving the first data and the second data stored in the first specified area of the volatile memory to the second specified area.

According to various embodiments, moving data to the third specified area of the nonvolatile memory may include: identifying a state of the nonvolatile memory; and when the state of the nonvolatile memory satisfies another specified condition, moving at least one data that satisfies another specified condition from among the first data and the second data from the second specified area of the volatile memory to the third specified area of the nonvolatile memory.

According to various embodiments, moving data to the third specified area of the nonvolatile memory may include, when the state of the nonvolatile memory does not satisfy another specified condition, prohibiting the first data and the second data from being moved from the second specified area of the volatile memory to the third specified area of the nonvolatile memory.

According to various embodiments, the state of the memory may include a usable capacity of the third specified area, a lifetime of the third specified area, a lifetime of the nonvolatile memory, or a combination thereof.

According to various embodiments, moving data to the third specified area of the nonvolatile memory may include: selecting one of the first data and the second data according to the specified condition; and moving the selected one data from the second specified area to the third specified area.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner Further, some operations may be executed according to another order or may be omitted, or other operations may be added. The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

The embodiments disclosed in the present document are suggested for explanation and understanding of the disclosed technical features, and are not intended to limit the scope of various embodiments of the present disclosure. Therefore, the scope of various embodiments of the present disclosure should be interpreted as including all changes or various other embodiments based on the technical idea of various embodiments of the present disclosure.

What is claimed is:

1. An electronic device comprising:
a volatile memory;
a nonvolatile memory; and
a processor configured to:
   store first data and second data which are stored in a first specified area of the volatile memory in a second specified area of the volatile memory,
   identify an order in which the first data and the second data are stored in the second specified area,
   determine, based on the order, whether a state of at least one of the first data and the second data satisfies a specified condition, and
   when the state of at least one of the first data and the second data satisfies the specified condition, move the at least one of the first data or the second data from the second specified area of the volatile memory to a third specified area of the nonvolatile memory,
wherein the specified condition comprises a serial number and time information of the first data and second data stored in the second specified area.

2. The electronic device of claim 1, wherein the specified condition further comprises at least one of a time at which data is stored in the second specified area, an estimated time at which data is to be stored in the second specified area, a frequency of use of data, or a last using time of data.

3. The electronic device of claim 1, wherein, when the state of at least one of the first data and the second data satisfies another specified condition, the processor is further configured to prohibit the first data and the second data from being moved from the second specified area of the volatile memory to the third specified area of the nonvolatile memory at least temporarily.

4. The electronic device of claim 3, wherein the another specified condition comprises at least one of a time at which data is stored in the second specified area, an estimate time at which data is to be stored in the second specified area, a frequency of use of data, or a last using time of data.

5. The electronic device of claim 1, wherein the processor is further configured to:
identify at least one of capacities or compression rates of the first data and the second data, and
determine the state of at least one of the first data and the second data further based on the at least one of the capacity or the compression rate.

6. The electronic device of claim 1, wherein the processor is further configured to:
identify a time at which the first data and the second data are stored in the volatile memory, and
determine the state of the first data and the second data further based on the time at which the data is stored.

7. The electronic device of claim 1,
wherein the first data and the second data which are stored in the second specified area comprise compressed data, and
wherein the processor is further configured to:
   generate decompressed data by using at least a portion of the compressed data, as at least a portion of the moving operation, and
   store the decompressed data in the third specified area of the nonvolatile memory.

8. The electronic device of claim 1,
wherein the first specified area comprises an area which stores uncompressed data at least temporarily, and
wherein the second specified area comprises an area which stores compressed data at least temporarily.

9. The electronic device of claim 1, wherein the processor is further configured to move the first data and the second data from the first specified area to the second specified area, based on a usable capacity of the first specified area.

10. The electronic device of claim 1, wherein the processor is further configured to:
detect an event for moving data from the second specified area to the third specified area, based on a usable capacity of the first specified area or a usable capacity of the second specified area, and
move at least one of the first data or the second data that satisfies the specified condition to the third specified area, based on the detecting operation.

11. The electronic device of claim 1, wherein the processor is further configured to:
identify a state of the nonvolatile memory, and,
when the state of the nonvolatile memory satisfies another specified condition, move at least one data of the first data or the second data that satisfies the another specified condition from the second specified area of the volatile memory to the third specified area of the nonvolatile memory.

12. The electronic device of claim 11, wherein, when the state of the nonvolatile memory does not satisfy the another specified condition, the processor is further configured to prohibit the first data and the second data from being moved from the second specified area of the volatile memory to the third specified area of the nonvolatile memory at least temporarily.

13. The electronic device of claim 11, wherein the state of the memory comprises at least one of a usable capacity of the third specified area, a lifetime of the third specified area, or a lifetime of the nonvolatile memory.

14. The electronic device of claim 1, wherein the processor is further configured to:
select one of the first data or the second data according to the specified condition, and
move the selected one data from the second specified area to the third specified area.

15. An operating method of an electronic device, the operating method comprising:
storing first data and second data which are stored in a first specified area of a volatile memory in a second specified area of the volatile memory;
identifying an order in which the first data and the second data are stored in the second specified area;
determining, based on the order, whether a state of at least one of the first data and the second data satisfies a specified condition; and
when the state of at least one of the first data and the second data satisfies the specified condition based on the order, moving the at least one of the first data or the second data from the second specified area of the volatile memory to a third specified area of a nonvolatile memory,
wherein the specified condition comprises a serial number and time information of the first data and second data stored in the second specified area.

16. The method of claim 15, wherein the specified condition further comprises at least one of a time at which data is stored in the second specified area, an estimated time at which data is to be stored in the second specified area, a frequency of use of data, or a last using time of data.

17. The method of claim 15, further comprising:
when the state of at least one of the first data and the second data satisfies another specified condition, prohibiting the first data and the second data from being moved from the second specified area of the volatile memory to the third specified area of the nonvolatile memory at least temporarily.

18. The method of claim 17, wherein the another specified condition comprises at least one of a time at which data is stored in the second specified area, an estimate time at which data is to be stored in the second specified area, a frequency of use of data, or a last using time of data.

19. The method of claim 15, further comprising:
identifying at least one of capacities or compression rates of the first data and the second data; and
determining the state of the first data and the second data further based on at least one of the capacity or the compression rate.

20. The method of claim 15, further comprising:
identifying a time at which the first data and the second data are stored in the volatile memory; and
determining the state of at least one of the first data and the second data further based on the time at which the data is stored.

* * * * *